United States Patent
Kato et al.

(10) Patent No.: US 7,602,280 B2
(45) Date of Patent: Oct. 13, 2009

(54) TIRE PRESSURE MONITORING SYSTEM

(75) Inventors: Manabu Kato, Nagoya (JP); Eiji Fujioka, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 376 days.

(21) Appl. No.: 11/723,618

(22) Filed: Mar. 21, 2007

(65) Prior Publication Data
US 2007/0229242 A1 Oct. 4, 2007

(30) Foreign Application Priority Data
Mar. 29, 2006 (JP) ............................. 2006-090276
Mar. 29, 2006 (JP) ............................. 2006-090277

(51) Int. Cl.
*B60C 23/00* (2006.01)
(52) U.S. Cl. ...................... 340/447; 340/442; 340/445; 73/146.5
(58) Field of Classification Search .................. 340/447
See application file for complete search history.

(56) References Cited

U.S. PATENT DOCUMENTS

| | | | |
|---|---|---|---|
| 5,924,055 A | 7/1999 | Hattori | |
| 6,218,936 B1 | 4/2001 | Imao | |
| 6,657,540 B2 * | 12/2003 | Knapp | 340/442 |
| 7,075,419 B2 * | 7/2006 | Watabe | 340/447 |

FOREIGN PATENT DOCUMENTS

| | | |
|---|---|---|
| JP | 8-227492 A | 9/1996 |
| JP | 2000-71726 A | 3/2000 |
| JP | 2000-103209 A | 11/2000 |
| JP | 2001-322411 A | 11/2001 |
| JP | 3401535 B2 | 2/2003 |
| JP | 2004-268612 A | 9/2004 |
| JP | 3632561 B2 | 1/2005 |

\* cited by examiner

*Primary Examiner*—Donnie L Crosland
(74) *Attorney, Agent, or Firm*—Sughrue Mion, PLLC

(57) ABSTRACT

A tire pressure monitoring system includes tire-based transmitting and receiving devices and a vehicle body-based transmitting and receiving device having vehicle body-based receiving means, vehicle body-based transmitting means, wherein $(2^m-1) \times (2^n-1) \geq t$ is satisfied with t, m and n representing the number of the tire-based transmitting and receiving devices, the number of vehicle body-based transmitting groups and the number of vehicle body-based receiving groups respectively, each tire-based transmitting and receiving device receives the transmission request from any one of the vehicle body-based transmitting groups, the information transmitted from the tire-based transmitting and receiving device is received by any one of the vehicle body-based receiving groups, and each tire-based transmitting and receiving device has a different combination of the groups of the vehicle body-based transmitting means and the vehicle body-based receiving means.

15 Claims, 9 Drawing Sheets

TIRE PRESSURE MONITORING SYSTEM

CROSS REFERENCE TO RELATED APPLICATIONS

This application is based on and claims priority under 35 U.S.C §119 with respect to Japanese Patent Application 2006-090276 and 2006-090277, filed on Mar. 29, 2006, the entire content of which is incorporated herein by reference.

FIELD OF THE INVENTION

This invention relates to a tire pressure monitoring system measuring air pressure of tire interior spaces which are defined by tires and wheels of a vehicle.

BACKGROUND

Known is a tire pressure monitoring system which measures air pressure of tire interior spaces which are defined by a plurality of tires and a plurality of wheels provided at a vehicle, and enables to monitor whether the air pressure is normal or not. The tire pressure monitoring system disclosed in JP 2004-268612A includes a plurality of tire-based transmitting and receiving devices and a vehicle body-based transmitting and receiving device provided at the vehicle body side of the vehicle. The tire-based transmitting and receiving device is installed on each tire interior space and has an air pressure measurement means for measuring the air pressure of the tire interior space. In the tire pressure monitoring system disclosed in JP 2004-268612A, the vehicle body-based transmitting and receiving device wirelessly transmits the transmission request for identification information unique to each tire-based transmitting and receiving device and the measurement information measured by the air pressure measurement means to the tire-based transmitting and receiving devices. Then, the tire-based transmitting and receiving device receives the transmission request and wirelessly transmits its identification information and the measurement information. The vehicle body-based transmitting and receiving device is provided with transmitting antennas individually installed for each tire and the transmitting antenna is used for transmitting the transmission request. The vehicle body-based transmitting and receiving device transmits the transmission request to the tire-based transmitting and receiving device of each tire by turns. Namely, the vehicle body-based transmitting and receiving device is designed to determine which position the tire-based transmitting and receiving device, which sends back the identification information and the measurement information, is provided at the vehicle by transmitting the transmission request to the tire-based transmitting and receiving device after identifying the position of the tire.

In the tire pressure monitoring system disclosed in JP 2004-268612, in order to identify the position of the tire-based transmitting and receiving device, it is necessary to identify the position of a tire and then transmit the transmission request only to a tire-based transmitting and receiving device located at the tire. Thus, a transmitting antenna, which is used for transmitting the transmission request from the vehicle body-based transmitting and receiving device, is needed to be individually installed for each of tire-based transmitting and receiving device. Further, in order that the vehicle body-based transmitting and receiving device may receive the measurement information from all of the tire-based transmitting and receiving devices provided at the vehicle while being able to identify the position, the same number of transmission request as the number of the tire-based transmitting and receiving device must be transmitted by each transmitting antenna. Thus, processing load is increased in request transmitting processing for the transmission request and information receiving processing for the identification information and the measurement information.

The present invention has been made in view of the above circumstances, and provides a tire pressure monitoring system. More specifically, the invention provides the tire pressure monitoring system which is able to determine positions of all tire-based transmitting and receiving devices while performing request transmitting processing of transmission requests and information receiving process of identification and measurement information.

SUMMARY OF THE INVENTION

According to an aspect of the present invention, a tire pressure monitoring system includes a plurality of tire-based transmitting and receiving devices respectively installed at tire interior spaces defined by a plurality of tires and a plurality of wheels provided at a vehicle, each tire-based transmitting and receiving device having an air pressure measuring means measuring pressure of the tire interior space, a tire-based transmitting means transmitting, to an exterior portion, unique identification information specified to the tire-based transmitting and receiving device and measurement information of the air pressure measuring means, a tire based receiving means receiving a transmission request from the exterior portion for transmitting the identification information and the measurement information, and a tire based controlling means performing information transmitting processing for the tire based transmitting means to transmit the identification information and the measurement information to the exterior portion when the tire based receiving means receives the transmission request, and a vehicle body-based transmitting and receiving device installed at a vehicle body having a plurality of vehicle body-based receiving means receiving the identification information and the measurement information transmitted from the tire-based transmitting and receiving devices, a plurality of vehicle body-based transmitting means transmitting the transmission requests to the tire-based transmitting and receiving devices, and a vehicle body-based controlling means performing information receiving processing for the vehicle body-based receiving means to receive the identification information and the measurement information and request transmitting processing for the vehicle body-based transmitting means to transmit the transmission requests, wherein the vehicle body-based transmitting means are less in quantity than the tire-based transmitting and receiving devices and are divided into plural transmitting groups, each of which transmitting group has at least one of the vehicle body-based transmitting means, and the request transmitting processing is implemented on a per transmitting group basis, wherein the vehicle body-based receiving means are less in quantity than the tire-based transmitting and receiving devices and are divided into plural receiving groups, each of which receiving group has at least one of the vehicle body-based receiving means, and the identification information and the measurement information, which are transmitted from the tire-based transmitting and receiving devices, are received on a per receiving group basis, wherein a relational expression $(2^m-1) \times (2^n-1) \geq t$ is satisfied with a variable t representing the number of the tire-based transmitting and receiving devices, a variable m representing the number of the transmitting groups and a variable n representing the number of the receiving groups, each tire-based transmitting and receiving device is configured to receive the transmission request from the vehicle body-based transmitting means of any one of the transmitting groups, the identification information and the measurement information transmitted from the tire-based transmitting and receiving device is received by the vehicle body-based receiving means of any one of the receiving groups, and each tire-based transmitting and receiving device has a different combination of the transmitting group of the vehicle body-based transmitting means that transmits the transmission request receivable by the tire-based transmitting and receiving device and the receiving group of the vehicle body-based receiving means which receives the identification information and the measurement information transmitted from the tire-based transmitting and receiving device.

According to another aspect of the present invention, a tire pressure monitoring system includes a plurality of tire-based transmitting and receiving devices respectively installed at tire interior spaces defined by a plurality of tires and a plurality of wheels provided at a vehicle, each tire-based transmitting and receiving device having a tire information measuring means measuring at least pressure of the tire interior space, a tire based transmitting means wirelessly transmitting, to an exterior portion, identification information uniquely specified to the tire-based transmitting and receiving device and measurement information of the tire information measuring means, a tire based receiving means receiving a transmission request from the exterior portion for transmitting the identification information and the measurement information, and a tire based controlling means performing information transmitting processing for the tire based transmitting means to transmit the identification information and the measurement information to the exterior portion when the tire based receiving means receives the transmission request, a vehicle body-based transmitting and receiving device installed at a vehicle body having one or more vehicle body-based receiving means receiving the identification information and the measurement information transmitted from the tire-based transmitting and receiving devices, two or more vehicle body-based transmitting means transmitting the transmission requests to the tire-based transmitting and receiving devices; and a vehicle body-based controlling means performing information receiving processing for the vehicle body-based receiving means to receive the identification information and the measurement information and request transmitting processing for the vehicle body-based transmitting means to transmit the transmission requests, wherein the two or more vehicle body-based transmitting means are less in quantity than the tire-based transmitting and receiving devices and are arranged so that each tire-based transmitting and receiving device has a different combination of the vehicle body-based transmitting means from among two or more vehicle body-based transmitting means which transmit the transmission requests received by the one tire-based transmitting and receiving, device from among the tire-based transmitting and receiving devices, the vehicle based controlling means determines installation positions of the tire-based transmitting and receiving devices in the vehicle based on a combination of one and more identification information received by the one or more vehicle body-based receiving means when the transmission requests are respectively transmitted from the two or more vehicle body-based transmitting means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described below with reference to the attached drawings.

First Embodiment

Figure 1:
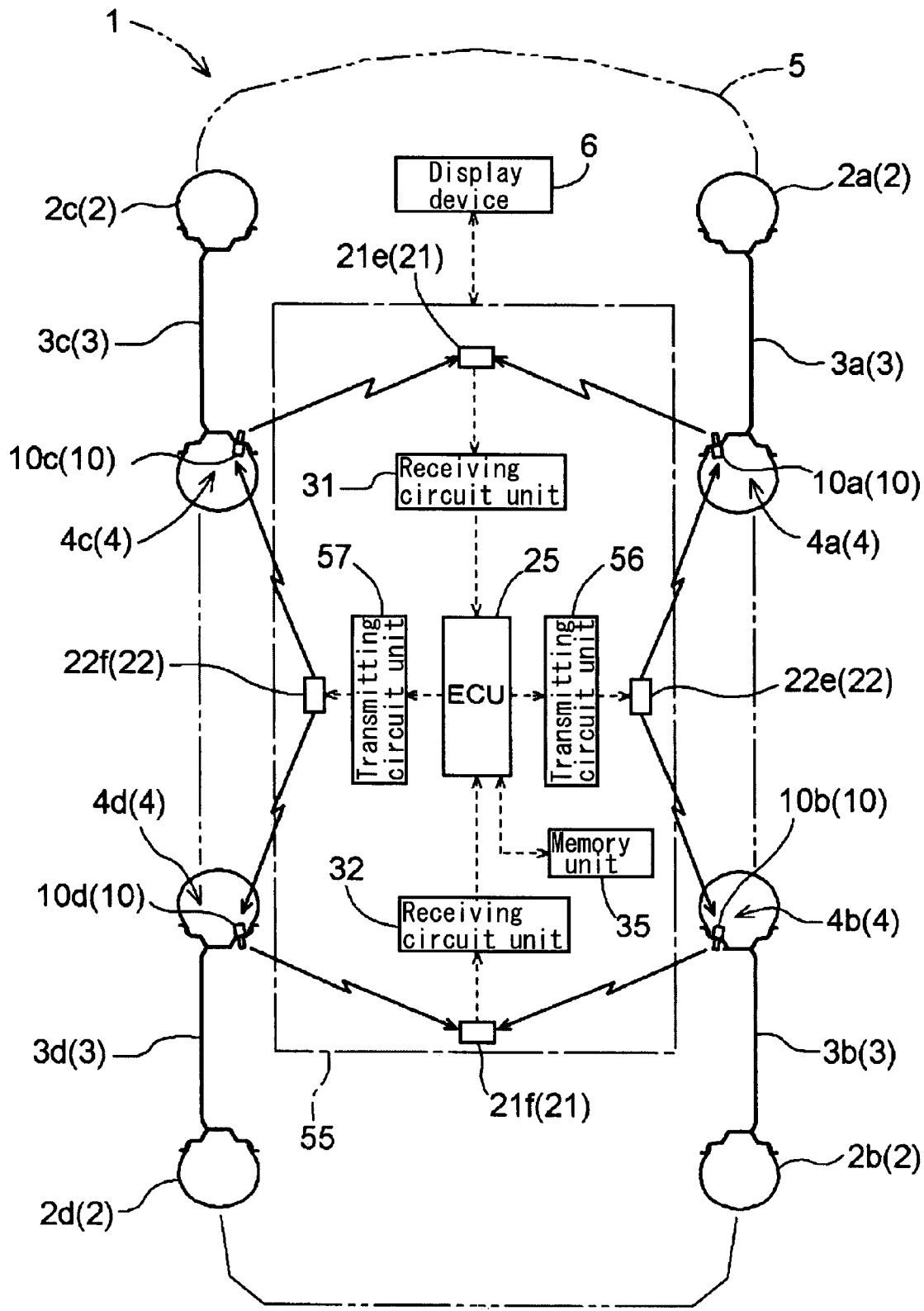
FIG. 1 is a functional block diagram of a tire pressure monitoring system according to a first embodiment.
Figure 2:
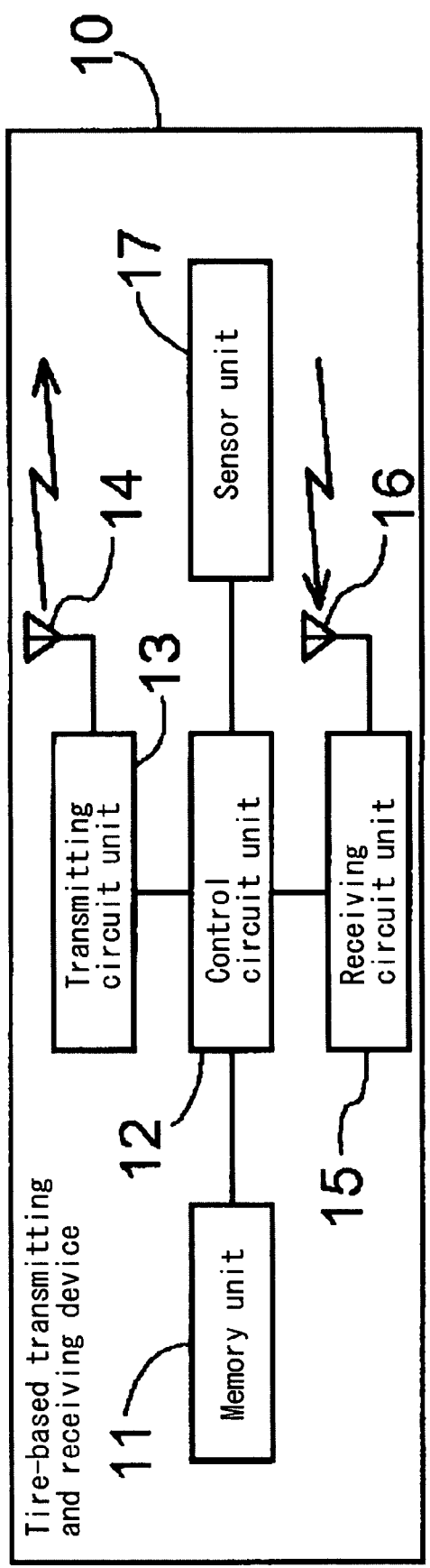
FIG. 2 is a functional block diagram of a tire-based transmitting and receiving device.

A tire pressure monitoring system, according to a first embodiment, will be described below with reference to the attached drawings. FIG. 1 is a functional block diagram of the tire pressure monitoring system. The tire pressure monitoring system includes a plurality of tire-based transmitting and receiving devices 10 (10a to 10d) and a vehicle body-based transmitting and receiving device 55. A plurality of tires 2 (2a to 2d) and a plurality of wheels 3 (3a to 3d) are provided at a vehicle 1, and a plurality of tire interior spaces 4 (4a to 4d) are defined by the respective tires 2 and wheels 3. The respective tire-based transmitting and receiving devices 10 (10a to 10d) are installed at each tire interior space 4 (4a to 4d). FIG. 2 is a functional block diagram of the tire-based transmitting and receiving device 10. The configurations of the respective tire-based transmitting and receiving devices 10 (10a to 10d), which are installed at each tire interior space, are identical.

Each tire-based transmitting and receiving device 10 (10a~10d) is provided with a transmitting circuit unit 13, a transmitting antenna 14, a receiving antenna 16 and a receiving circuit unit 15 and is configured so as to be able to transmit and receive information to and from outside. The transmitting circuit unit 13 and the transmitting antenna 14 are used to wirelessly transmit unique identification information, which is specified to each tire-based transmitting and receiving device 10, and measurement information measured by a sensor unit 17 to outside of the tire interior spaces 4 (4a to 4d). The receiving antenna 16 and the receiving circuit unit 15 are used to receive a transmission request for the measurement information from outside. Each tire-based transmitting and receiving device 10 (10a to 10d) is provided with the sensor unit 17, a memory unit 11, and a control circuit unit 12. The sensor unit 17 serves as a pneumatic sensor which measures the air pressure of each tire interior space 4 (4a to 4d), the memory unit 111 stores information (identification information, measurement information, and the likes) handled in the inside of the respective tire-based transmitting and receiving devices 10 (10a to 10d) and the control circuit unit 12 performs information transmitting processing for the transmitting antenna 14 and the transmitting circuit unit 13 to transmit its identification and measurement information to the outside, once the receiving antenna 16 and the receiving circuit unit 13 receive the transmission request from the outside. As described above, the sensor unit 17 corresponds to an air pressure measuring means, the transmitting antenna 14 corresponds to a tire based transmitting means, and the control circuit unit 12 corresponds to a tire based controlling means.

The vehicle body-based transmitting and receiving device 55 is provided with receiving antennas 21 (21*e*, 21*f*) and transmitting antennas 22 (22*e*, 22*f*). The receiving antennas 21(21*e*, 21*f*) receive the identification and measurement information transmitted from the tire-based transmitting and receiving devices 10 (10*a* to 10*d*) and the transmitting antennas 22 (22*e*, 22*f*) transmit transmission requests to the tire-based transmitting and receiving devices 10 (10*a* to 10*d*). Further, the vehicle body-based transmitting and receiving device 55 is provided with a memory unit 35 and an ECU (electrical control unit) 25. The memory unit 35 stores information handled in the vehicle body-based transmitting and receiving device 55 (identification and measurement information received from the tire-based transmitting and receiving devices 10 (10*a* to 10*d*) and the likes). The ECU 25 performs information receiving processing of the identification and measurement information with the receiving antennas 21 (21*e*, 21*f*) and the receiving circuit units 31 and 32. The ECU 25 also performs request transmitting processing with the transmitting antennas 22 (22*e* and 22*f*) and the transmitting circuit units 56 and 57.

As described above, the receiving antennas 21 (21*e*, 21*f*) correspond to a vehicle body-based receiving means of the embodiment of the present invention, the transmitting antennas 22 (22*e*, 22*f*) correspond to a vehicle body-based transmitting means of the embodiment of the present invention, and the memory unit 35 corresponds to a vehicle body-based memory means, and the ECU 25 corresponds to a vehicle body-based controlling means.

The specific configurations of the vehicle body-based transmitting and receiving device 55 and the tire-based transmitting and receiving devices 10 (10*a* to 10*d*) will be described below. The vehicle body-based transmitting and receiving device 55 transmits the transmission request for the identification and measurement information to each tire-based transmitting and receiving device 10 (10*a* to 10*d*) and receives the identification and measurement information, which are sent back, to obtain information regarding the tire pressure of the vehicle 1. Then, the measurement information which the vehicle body-based transmitting and receiving device 55 obtains is displayed on a display device 6 provided at the vehicle 1 so that the occupant is able to recognize the information. At this time, as will be described later, the display device 6 also displays the installation position of the tire interior space from which the information regarding the tire pressure is transmitted so that the occupant is able to recognize. In addition to the measurement information, the identification information may be displayed in the display device 6. The transmitting circuit units 56 and 57 perform modulation processing of the above-mentioned transmission requests and the receiving circuit units 31 and 32 perform demodulation processing of the signals, which are received by the respective antennas 21*e* and 21*f*.

The control circuit unit 12 of each tire-based transmitting and receiving device 10 (10*a* to 10*d*) stores the measurement information regarding the pressure of the tire interior space, which is measured by the sensor 17 at a predetermined timing, in the memory unit 11 and receives the transmission request from the vehicle body-based transmitting and receiving device 55 via the transmitting antenna 16. In response to a receipt of the transmission request, the control circuit unit 12 performs data transmission processing to transmit the measurement information stored in the memory unit 11 and its identification information of the tire-based transmitting and receiving device 10 to the outside via the transmitting antenna 14. Moreover, the receiving circuit unit 15 and the transmitting circuit unit 13 of each tire-based transmitting and receiving device 10 (10*a* to 10*d*) perform the demodulation processing of the received signal and the modulation processing of the signal to be sent.

Further, the tire pressure monitoring system, according to the embodiment, has a function of determining the installation position (right front, right rear, left front, and left rear) of the tire-based transmitting and receiving device 10 from which the identification and measurement information received by the vehicle body-based transmitting and receiving device 55 is transmitted in the vehicle. Hence, the vehicle body transmitting and receiving device 55 has a plurality of the vehicle body-based receiving means (receiving antenna 21*e* and receiving antenna 21*f*) and a plurality of the vehicle body-based transmitting means (transmitting antenna 22*e* and transmitting antenna 22*f*). The vehicle body-based receiving means receive the measurement information transmitted from the tire-based transmitting and receiving devices 10 (10*a* to 10*d*) and the vehicle body-based transmitting means transmit the transmission request to the tire-based transmitting and receiving devices 10 provided at the vehicle 1.

Next, operations of the tire-based transmitting and receiving devices 10 (10*a* to 10*d*) and the vehicle body transmitting and receiving device 55 will be described. More specifically, the operations performed after the transmitting and receiving device 55 transmits the transmission requests to the tire transmitting and receiving devices 10 (10*a* to 10*d*) will be described. As described above, in the tire pressure monitoring system of the embodiment, it is necessary to determine the installation position (right front, right rear, left front, and left rear of the vehicle 1 in the embodiment) of the tire-based transmitting and receiving device from which the identification and measurement information received by the vehicle body-based receiving and transmitting device 55 is transmitted. In the tire pressure monitoring system according to the embodiment, the transmitting antennas 22*e* and 22*f*, which serve as vehicle body-based transmitting means, are less in quantity than the tire-based transmitting and receiving devices 10 and are divided into plural transmitting groups. Each of the transmitting groups has at least one transmitting antenna 22 and performs the request transmitting processing on a per group basis. Also, the receiving antennas 21*e* and 21*f*, which serve as vehicle body-based transmitting means, are less in quantity than the tire-based transmitting and receiving devices 10 and are divided into plural receiving groups. Each of the receiving groups has at least one receiving antenna 21 and receives the identification and measurement information transmitted from the tire-based transmitting and receiving devices 10 on a per group basis. Furthermore, each tire-based transmitting and receiving device 10 (10*a* to 10*d*) is configured to receive the transmission request from the transmitting antennas 22 of any one of the transmitting groups (transmitting antennas 22*e*, 22*f*). Also, the identification and measurement information transmitted from each tire-based receiving and transmitting device 10 is received by the receiving antennas 21 of any one of the plural receiving groups (receiving antennas 21*e*, 21*f*). Furthermore, each tire-based transmitting and receiving 10 has a different combination of the transmitting group of the transmitting antennas 22 which transmits the transmission requests receivable by the tire-based transmitting and receiving device 10 and the receiving group of the receiving antennas 21 which are able to receive the identification and measurement information transmitted from each tire-based transmitting and receiving device 10.

Specifically, in the embodiment shown in FIG. 1 as an example, the vehicle is a four-wheel vehicle and thus there are four sets of tires 2 and wheels 3 provided at the vehicle 1. Namely, the number of the tire-based transmitting and receiving devices 10 is 4. The number of the transmitting antennas 22, which are included in the vehicle body-based transmitting and receiving device 55 and serve as vehicle body-based receiving means, is 2 and the number of the receiving antennas 21, which serve as the vehicle body-based receiving means, is 2. Further, out of the two receiving antennas 21, the receiving antenna 21e located at a front wheel side, is provided at a front side relative to a center of a wheelbase of the vehicle and the receiving antenna 21f located at a rear wheel side is provided at a rear side relative to the center of the wheelbase of the vehicle. The transmitting antenna 22e of the vehicle body-based receiving and transmitting device 55 transmits the transmission requests and the transmission requests are received by the two tire-based transmitting and receiving devices 10a and 10b of the tire-based transmitting and receiving devices 10. The tire-based transmitting and receiving devices 10a and 10b are provided at a right side of the vehicle 1. The transmitting antenna 22f of the vehicle body-side transmitting and receiving device 55 transmits the transmission requests and the transmission requests are received by the two tire-based transmitting and receiving devices 10c and 10d. The tire-based transmitting and receiving devices 10c and 10d are provided at a left side of the vehicle 1.

In other words, the transmitting antennas 22e and 22f compose a group respectively (Therefore, the group number is 2) and the above-mentioned request transmitting processing is preformed on a per group basis (i.e. the transmitting antennas 22e and 22f perform the processing respectively.) in this embodiment. Then, the tire-based transmitting and receiving devices 10a and 10b are able to receive the transmission request from one group of the transmitting antenna 22e, and the tire-based transmitting and receiving devices 10c and 10d are able to receive the transmission request from the other group of the transmitting antenna 22f.

Similarly, the two tire-based transmitting and receiving devices 10a and 10c, which are provided at the front wheel side, of the tire-based transmitting and receiving devices 10 (10a to 10d) transmit the identification and measurement information and the information is received by the receiving antenna 21e included in the vehicle body-based transmitting and receiving device 55. Furthermore, the tire transmitting and receiving devices 10b and 10d, which are provided at the rear wheel side of the vehicle 1, of the tire-based transmitting and receiving devices 10 transmit the identification and measurement information and the information is received by the receiving antenna 21f included in the vehicle body-based transmitting and receiving device 55.

In other words, the receiving antennas 21e and 21f compose a group respectively (Therefore, the group number is 2) and receive the identification information and the measurement information, which are transmitted from the tire transmitting and receiving devices 10, on a per group basis (the receiving antennas 21e and 21f respectively receive the information) in the embodiment. Furthermore, the identification and measurement information which are transmitted from the tire transmitting and receiving devices 10a and 10c can be received by one group of the receiving antenna 21e and the identification and measurement information which are transmitted from the tire transmitting and receiving devices 10b and 10d can be received by the other group of the receiving antenna 21f.

Table 1 summarizes the above described relationships between the tire transmitting and receiving devices 10 (10a to 10d) and the vehicle body-based transmitting and receiving device 55, provided that ○ represents that transmission is possible and X represents that transmission is impossible.

| | Transmitting antenna 22e | Transmitting antenna 22f | Receiving antenna 21e | Receiving antenna 21f |
|---|---|---|---|---|
| Tire-based transmitting and receiving device 10a | ○ | X | ○ | X |
| Tire-based transmitting and receiving device 10b | ○ | X | X | ○ |
| Tire-based transmitting and receiving device 10c | X | ○ | ○ | X |
| Tire-based transmitting and receiving device 10d | X | ○ | X | ○ |

As described above, in the embodiment, each tire-based transmitting and receiving device 10 has a different combination of the group of the transmitting antennas 22 that transmits the transmission request receivable by the tire-based transmitting and receiving device and the group of the receiving antennas 21 that receives the identification and measurement information transmitted from the tire-based transmitting and receiving device. As a result, as shown in TABLE 1, when the transmission request is transmitted from any one of the transmitting antennas 22 included in the vehicle body-based transmitting and receiving device 55, it is possible to determine the installation position of the tire-based transmitting and receiving device 10 (10a to 10d) having the identification information in the vehicle by analyzing which receiving antenna 21 receives the identification and measurement information from the tire-based transmitting and receiving device 10 (10a to 10d).

Next, explanation is provided on how many groups of the transmitting antennas 22 (That is, the group number of the vehicle body-based transmitting means) and the receiving antennas 21 (the group number of the vehicle body-based receiving means) of the vehicle body-based transmitting and receiving device 55 are respectively required to determine the position of each tire-based transmitting and receiving device 10 (10a to 10d) with a variable t representing the number of the sets of the tires 2 and the wheels 3, i.e. the number of the tire-based transmitting and receiving devices 10. In this embodiment, when the group number of the transmitting antennas 22 of the vehicle body-based transmitting and receiving device 55 is set to m, there are $2^m$ combinations of the case that the m pieces of the transmitting antenna 22 transmit the transmission requests and the case that the m pieces of the transmitting antennas 22 do not transmit the transmission requests. However, the identification information and the measurement information is not returned from the tire-based transmitting and receiving devices 10 (10a to 10d) unless at least one transmitting antenna from among m transmitting antennas 22 transmits the transmission request. For the reason, it is necessary to eliminate a case that all of m transmitting antennas 22 does not transmit the transmission request. Therefore, in this embodiment, the number of the combinations of the cases that the transmitting antenna 22 transmit or do not transmit is ($2^m-1$). Similarly, when the group number of the receiving antennas 21 of the vehicle body-based transmitting and receiving device 55 is set to n, there are $2^n$ combinations of the case that the n pieces receiving antennas 21 receive the identification and measurement information and the case that the n pieces receiving antennas 21 do not receive the information. However, at least one receiving antenna from among n receiving antennas 21 needs to receive the identification and measurement information from the tire-based transmitting and receiving devices 10 (10a to 10d). Thus, the case that all of the n receiving antennas 21 do not receive the identification and measurement information has to be eliminated. Therefore, in this embodiment, the number of the combinations of the cases that the n receiving antennas 21 receive the identification and measurement information and the case that the n receiving antennas 21 do not receive the information is ($2^n-1$). Therefore, the group number of the transmission antennas 22 of the vehicle body bode transmitting and receiving device 55 may be set to m and the group number of the receiving antennas 21 of the vehicle body-based transmitting and receiving device 55 may be set to n so that a relational expression $(2^m-1) \times (2^n-1) \geq t$ is satisfied with the variable t representing the number of the tire-based transmitting and receiving devices 10. Thus, in order to determine the positions of t tires, m pieces of the vehicle body side transmitting means and n pieces of the vehicle body side receiving means are required.

Second Embodiment

The tire pressure monitoring system of the second embodiment is different from that of the first embodiment in the configurations of the transmitting and receiving antennas of the vehicle body-based transmitting and receiving device. The tire pressure monitoring system of the second embodiment will be described below, however, the configurations, which are identical to that of the first embodiment, will be omitted.

Figure 3:
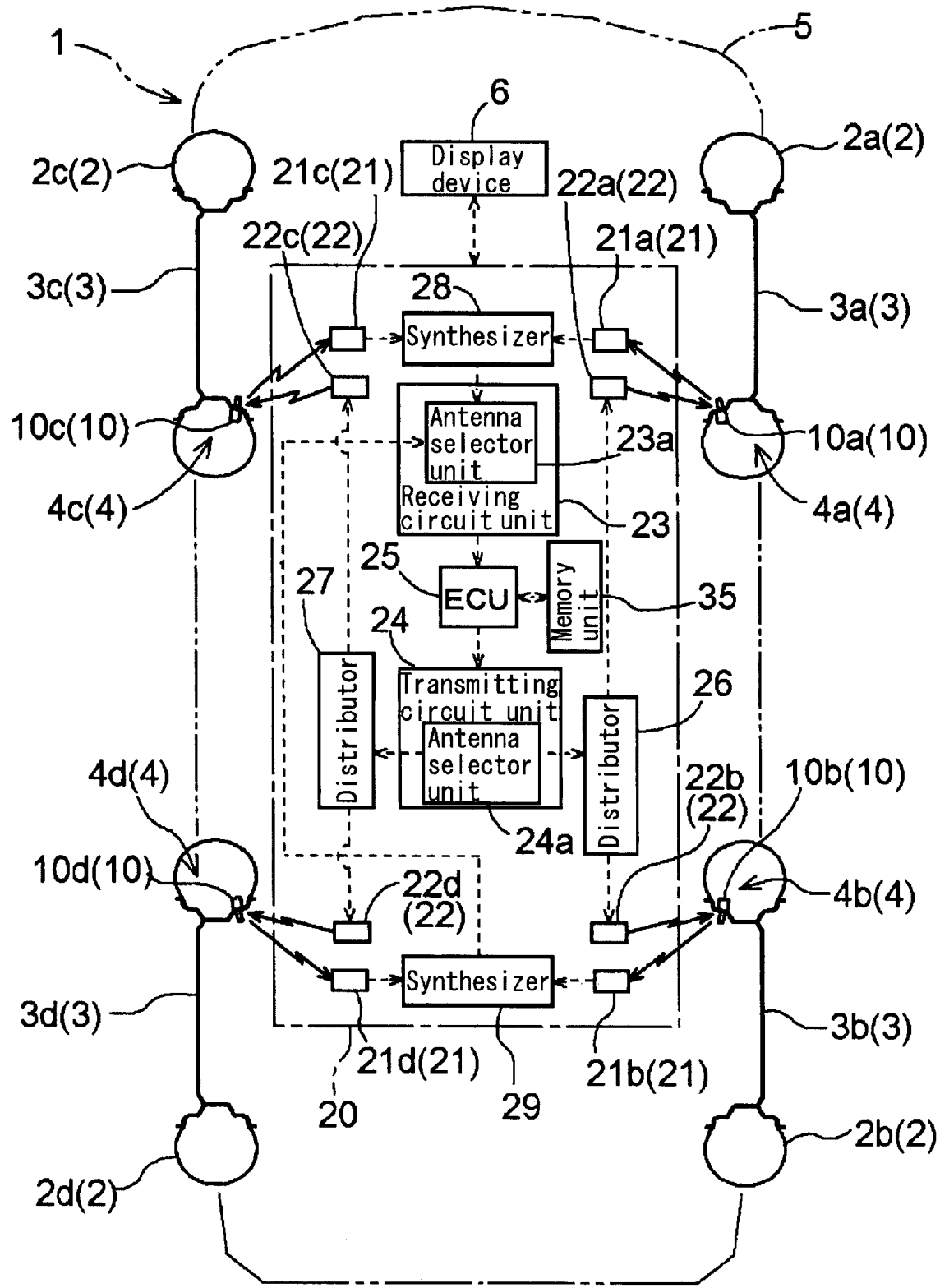
FIG. 3 is a functional block diagram of a tire pressure monitoring system according to a second embodiment.

FIG. 3 is a functional block diagram of the tire pressure monitoring system according to the second embodiment. In the second embodiment, the vehicle body-based transmitting and receiving device 20 has four transmitting antennas 22 (22a to 22d) each serving as a vehicle body-based transmitting means and four receiving antennas 21 (21a to 21d) each serving as a vehicle body-based receiving means. In the embodiment, the four transmitting antennas 22 of the vehicle body-based transmitting and receiving device 20 are provided at the side of the vehicle body 5 located near the tires 2 (2a to 2d), which are mounted in the vehicle 1 because the arrival distance of the radio wave, which is transmitted from each transmitting antenna, is short. That is, the transmission request wirelessly transmitted from each transmitting antenna 22 of the vehicle body-based transmitting and receiving device 20 is individually transmitted to the tire-based transmitting and receiving devices 10 located near the transmitting antennas 22. The four receiving antennas 21 (21a to 21d) of the vehicle body-based transmitting and receiving device 20 are provided at the side of the vehicle body 5 located near the tires 2, which are mounted in the vehicle 1 because the arrival distance of the radio wave, which is wirelessly transmitted from the tire-based transmitting and receiving device 10 is short. Namely, each receiving antenna 21 of the vehicle body-based transmitting and receiving device 20 is individually provided near each tire-based transmitting and receiving device 10 (10a to 10d).

The two receiving antennas 21a and 21c are provided at the front wheel side and are connected to the receiving circuit unit 23 via a synthesizer 28. The two receiving antennas 21b and 21d are provided at the rear wheel side and are connected to the receiving circuit unit 23 via the synthesizer 29. The receiving antennas 21a and 21c are provided at the front side relative to the center of the wheelbase and the receiving antennas 21b and 21d are provided at the rear side relative to the center of the wheelbase. The synthesizers 28 and 29 are used for synthesizing two signals into one signal. However, the receiving circuit unit 23 has an antenna selector unit 23a for switching the state allowing to communicate with the receiving antennas 21a and 21c, which antennas provided at the front wheel side to the state allowing to communicate with the receiving antennas 21b and 21d, which antennas provided at the rear wheel side. In other words, the receiving circuit unit 23 selectively switches the state receiving the radio wave with the front wheel side receiving antennas 21a and 21c to the state receiving the radio wave with the rear wheel side receiving antennas 21b and 21d by the antenna selector unit 23a and vice versa. That is to say, the vehicle body-based transmitting and receiving device 20 has the two vehicle body-based receiving means (receiving antenna 21a and receiving antenna 21c) at the front wheel side and also has the two vehicle body-based receiving means (receiving antenna 21b and receiving antenna 21d) at the rear wheel side.

Similarly, the two transmitting antennas 22a and 22b are provided at a right side of the vehicle 1 and are connected to the transmitting circuit unit 24 via a distributor 26. The two transmitting antennas 22c and 22d are provided at a left side of the vehicle 1 and are connected to the transmitting circuit unit 24 via a distributor 27. The distributors 26 and 27 are used for distributing one signal into two signals. However, the transmitting circuit unit 24 has an antenna selector unit 24a for switching the state allowing to communicate with the two transmitting antennas 22a and 22b, which antennas provided at the right wheel side to the state allowing to communicate with the two transmitting antennas 22c and 22d, which antennas provided at the left wheel side. In other words, the transmitting circuit unit 24 selectively switches the state transmitting the radio wave with the right wheel side receiving antennas 22a and 22b to the state transmitting the radio wave with the left wheel side receiving antennas 22c and 22d and vice versa by the antenna selector unit 24a. That is to say, the vehicle body-based transmitting and receiving device 20 has the two vehicle body-based transmitting means (transmitting antenna 22a and transmitting antenna 22b) at the right wheel side and also has the two vehicle body-based transmitting means (transmitting antenna 22c and transmitting antenna 22d) at the left wheel side.

Therefore, in the embodiment, the receiving antennas 21a and 21c compose one group and receive the identification information and the measurement information transmitted from the tire-based transmitting and receiving devices 10a and 10c on the group basis. The receiving antennas 21b and 21d compose the other group and receive the identification information and the measurement information transmitted from the tire-based transmitting and receiving devices 10b and 10d.

The transmitting antennas 22a and 22b compose one group and performs the request transmitting processing on the group basis. The transmitting antennas 22c and 22d composes the other group and performs the request transmitting processing on the group basis.

Table 2 summarizes relationships between the tire-based transmitting and receiving devices 10 (10a to 10d) and the vehicle body-based transmitting and receiving device 20 in a similar way as the first embodiment. ○ represents that the transmission is possible and X represents that the transmission is impossible.

|  | Transmitting antenna 22a, 22b | Transmitting antenna 22c, 22d | Receiving antenna 21a, 21c | Receiving antenna 21b, 21d |
|---|---|---|---|---|
| Tire-based transmitting and receiving device 10a | ○ | X | ○ | X |
| Tire-based transmitting and receiving device 10b | ○ | X | X | ○ |
| Tire-based transmitting and receiving device 10c | X | ○ | ○ | X |
| Tire-based transmitting and receiving device 10d | X | ○ | X | ○ |

As described above, in the embodiment, each tire-based transmitting and receiving device 10 can receive the transmission request from any one group of the transmitting antennas 22, out of plural groups thereof, and the identification and measurement information transmitted from each tire-based transmitting and receiving device 10 can be received by any one group of the receiving antennas 21, out of plural groups thereof. Each tire-based transmitting and receiving device 10 has a different combination of the groups of the transmitting and receiving antennas 21 and 22, in which the transmitting antennas 22 transmit the transmission requests receivable by each tire-based transmitting and receiving device 10 and each tire-based transmitting and receiving device 10 transmits the identification and measurement information receivable by the receiving antennas 21. As a result, as shown in Table 2, when the transmission request is transmitted from any one of the transmitting antennas included in the vehicle body-based transmitting and receiving device 20, it is possible to determine the installation position of the tire-based transmitting and receiving device 10 (10a to 10b) having the identification information in the vehicle 1 by analyzing which receiving antenna receives the identification and measurement information from tire-based transmitting and receiving device 10 (10a to 10d).

Third Embodiment

The tire pressure monitoring system according to the third embodiment is different from that of the second embodiment in the configuration of the receiving antenna of the vehicle body-based transmitting and receiving device. The tire pressure monitoring system according to the third embodiment will be described below. However, the description of the identical configuration to the second embodiment will be omitted.

Figure 4:
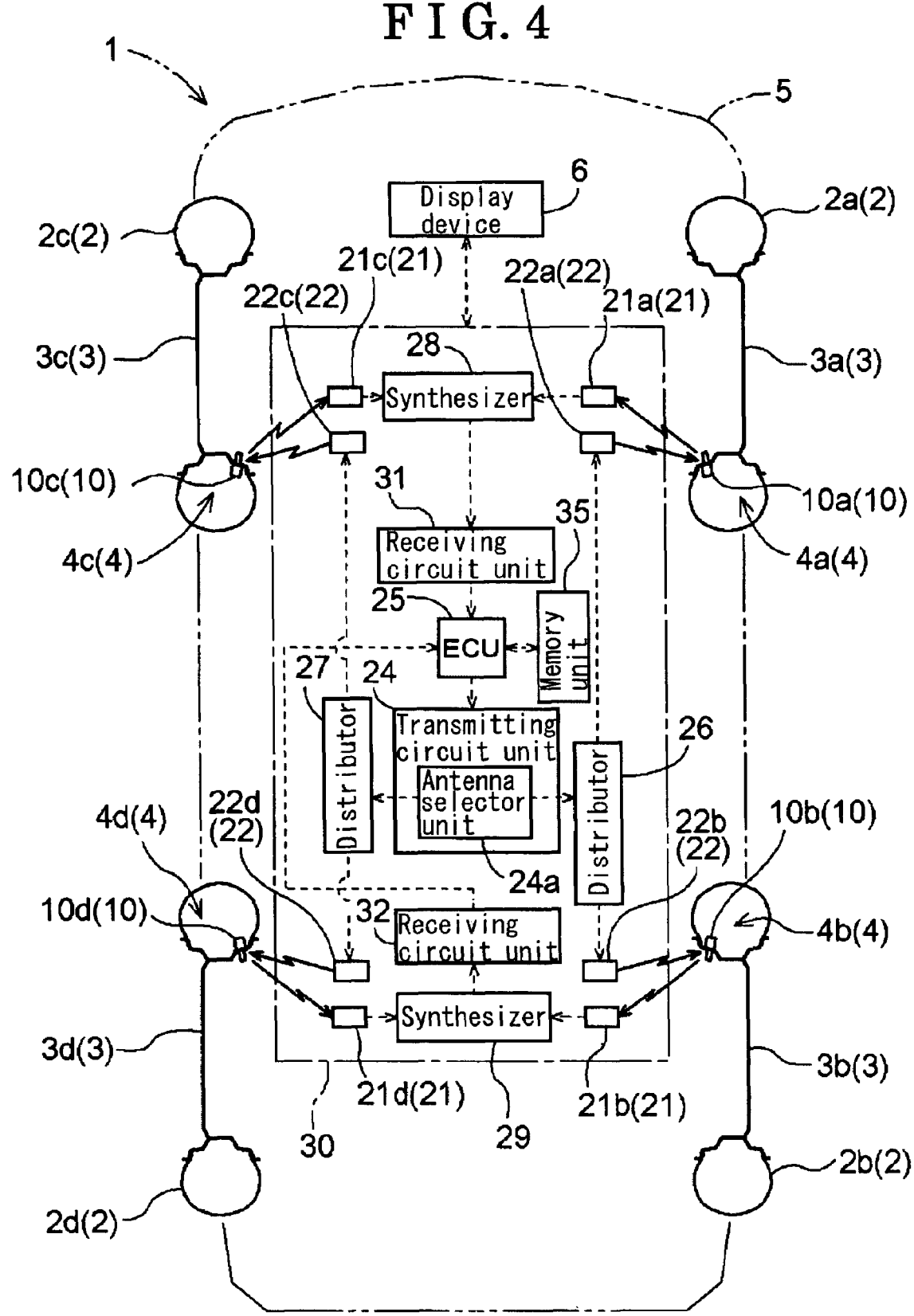
FIG. 4 is a functional block diagram of a tire pressure monitoring system according to a third embodiment.

FIG. 4 is a functional block diagram of the tire pressure monitoring system according to the third embodiment. The vehicle based transmitting and receiving device 30 has two receiving circuit units 31 and 32 in the tire pressure monitoring system according to the embodiment. In the third embodiment, the vehicle body-based transmitting and receiving device 30 has four transmitting antennas 22 (22a to 22d) each serving as a vehicle body-based transmitting means and four receiving antennas 21 (21a to 21d) each serving as a vehicle body-based receiving means. In the embodiment, the four transmitting antennas 22 (22a to 22d) of the vehicle body-based transmitting and receiving device 30 are provided at the side of the vehicle body 5 located near the tires 2 (2a to 2d) mounted in the vehicle 1. The two receiving antennas 21a and 21c are provided at the front wheel side and are connected to the receiving circuit unit 31 via the synthesizer 28. Similarly, the two receiving antennas 21b and 21c are provided at the rear wheel side and connected to the receiving circuit unit 32 via the synthesizer 29. Further, the receiving circuit units 31 and 32 are respectively connected to an ECU 25. As described above, the two receiving antennas 21a and 21c provided at the front wheel side and the two receiving antennas 21b and 21d provided at the rear wheel side are connected to the ECU 25 via the respective receiving circuit units 31 and 32. Thus, it is possible for ECU 25 to simultaneously receive the two identification information and measurement information from the receiving antenna 21a and the receiving antenna 21b. On the other hand, according to the second embodiment, the device is configured so that one of the receiving antennas 21a and 21b is selected by the antenna selector unit 23a. Hence, it is not possible for ECU 25 to simultaneously receive the two identification information and the two measurement information from the receiving antennas 21a and 21b.

As described above, the vehicle body-based transmitting and receiving device 30 according to the embodiment has the two vehicle body-based receiving means (receiving antennas 21a and 21c) at the front wheel side and further has the two vehicle body-based receiving means (receiving antennas 21b and 21c) at the rear wheel side.

Accordingly, in the embodiment, the receiving antennas 21a and 21c compose one group and receive the identification information and the measurement information transmitted from the tire-based transmitting and receiving devices 10a and 10c on a per group basis. The transmitting antennas 22a and 22b compose one group and perform the request transmitting processing on the group basis. The transmitting antennas 22c and 22d compose the other group and perform the request transmitting processing.

Table 3 summarizes relationships between the tire-based transmitting and receiving devices 10 (10a to 10d) and the vehicle body-based transmitting and receiving device 30 in the similar way to the second embodiment. However, ○ represents that the transmission is possible and X represents the transmission is impossible.

|  | Transmitting antenna 22a, 22b | Transmitting antenna 22c, 22d | Receiving antenna 21a, 21c | Receiving antenna 21b, 21d |
|---|---|---|---|---|
| Tire-based transmitting and receiving device 10a | ○ | X | ○ | X |
| Tire-based transmitting and receiving device 10b | ○ | X | X | ○ |
| Tire-based transmitting and receiving device 10c | X | ○ | ○ | X |
| Tire-based transmitting and receiving device 10d | X | ○ | X | ○ |

As described above, in the embodiment, each tire-based transmitting and receiving device 10 can receive the transmission request from any one group of the transmitting antennas 22, out of plural groups thereof, and the identification and measurement information transmitted from each tire-based transmitting and receiving device 10 can be received by any one group of the receiving antennas 21, out of plural groups thereof.

Each tire-based transmitting and receiving device 10 has a different combination of the groups of the transmitting and receiving antennas 21 and 22, in which the transmitting antennas 22 transmit the transmission requests receivable by each tire-based transmitting and receiving device 10 and each tire-based transmitting and receiving device 10 transmits the identification information and the measurement information receivable by the receiving antennas 21. Further, the ECU 25 can simultaneously receive the two identification and measurement information from the receiving antennas 21a and 21c (or the receiving antennas 21b and 21d). For example, in the second embodiment, the transmission requests are transmitted from the transmitting antennas 22a and 22b respectively and thus the request transmitting processing performed twice while the distributor 26 is selected by the antenna selector unit 24a. Also, the transmission requests are transmitted from the transmitting antennas 22c and 22d respectively and thus the request transmitting processing performed twice while the distributor 27 is selected by the antenna selector unit 24a. Therefore, the request transmitting processing has to be performed four times in total. However, in this embodiment, the vehicle body-based transmitting and receiving device 30 needs to perform the request transmitting processing only twice. One is performed to transmit the transmission request from the transmitting antennas 22a and 22b while the distributor 26 is selected by the antenna selector 24a. The other is performed to transmit the transmission request from the transmitting antennas 22c and 22d while the distributor 27 is selected by the antenna selector unit 24a. Hence, the number of the request transmitting processing of the vehicle body-based transmitting and receiving device 30 can be reduce. Consequently, the number of the information transmitting processing of the tire-based transmitting and receiving device 10 will be reduced. Therefore, it is possible to reduce the power consumption of the tire pressure monitoring system 10.

Fourth Embodiment

The tire pressure monitoring system according to a fourth embodiment is different from that of the third embodiment in the configuration of the receiving antenna of the vehicle body-based transmitting and receiving device. The tire pressure monitoring system according to the fourth embodiment will be described below. However, the description of the identical configurations to the third embodiment will be omitted.

Figure 5:
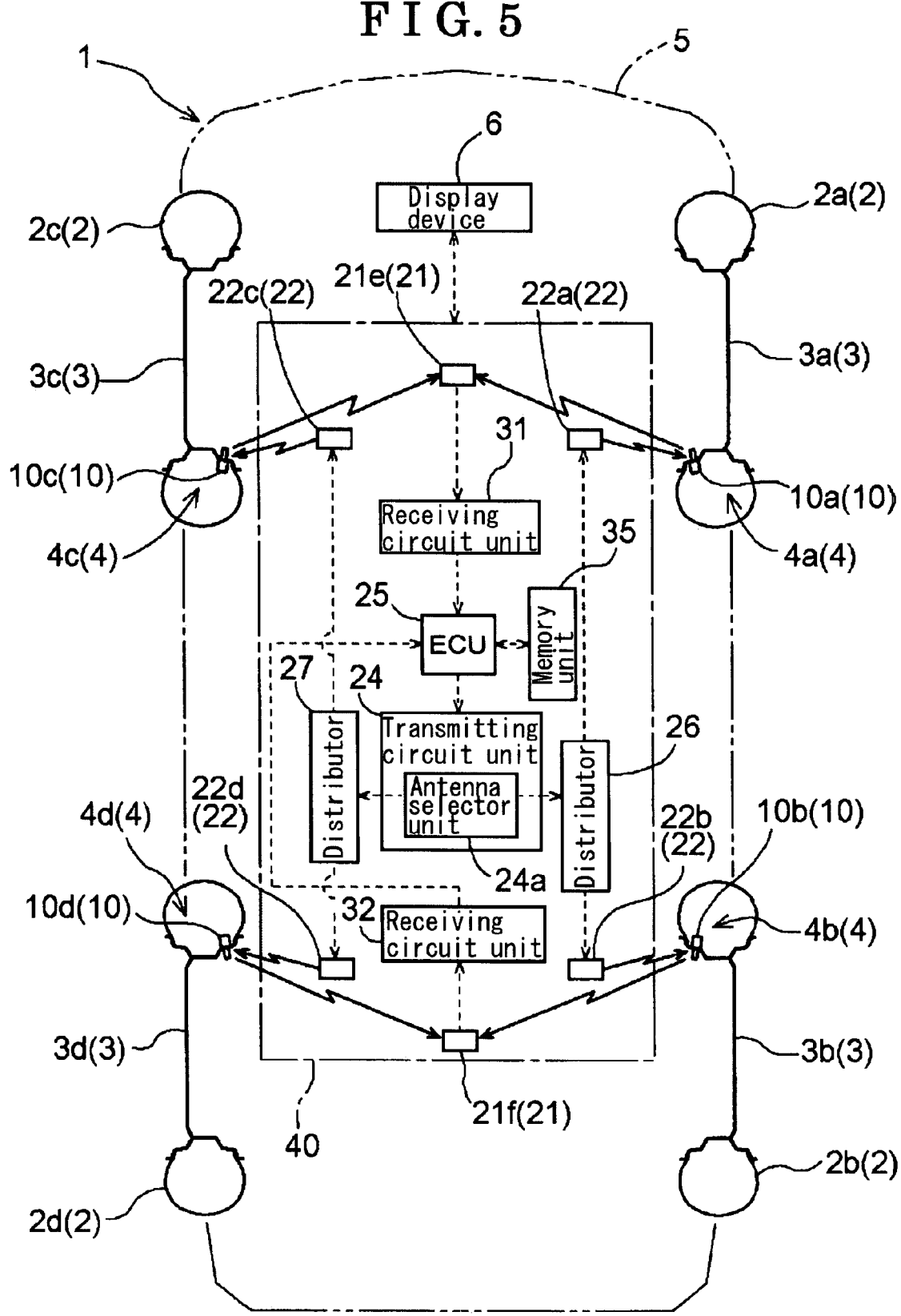
FIG. 5 is a functional block diagram of a tire pressure monitoring system according to a fourth embodiment.

FIG. 5 is a functional block diagram of the tire pressure monitoring system according to the fourth embodiment. In the fourth embodiment, the vehicle body-based transmitting and receiving device 40 has two receiving antennas 21 (21e, 21f) each serving a vehicle body-based receiving means. Then, the receiving antenna 21e is provided at the front wheel side of the vehicle 1 and is connected to the ECU 25 via the receiving circuit unit 31. The receiving antenna 21f is provided at the rear wheel side of the vehicle 1 and is connected to the ECU 25 via the receiving circuit unit 32. The receiving antenna 21e is able to receive the radio wave transmitted from the tire-based transmitting and receiving devices 10a and 10c, which are provided at the front wheel side of the vehicle 1. The receiving antenna 21f is able to receive the radio wave transmitted from the tire-based transmitting and receiving devices 10b and 10d, which are provided at the rear wheel side of the vehicle 1. In other words, the vehicle body-based transmitting and receiving device 40 has a vehicle body-based receiving means (receiving antenna 21e) at the front wheel side and the vehicle body-based receiving means (receiving antenna 21f) at the rear wheel side.

Therefore, in the embodiment, the receiving antenna 21e composes one group and receives the identification and measurement information transmitted from the tire-based transmitting and receiving devices 10a and 10c on a per group basis. The receiving antenna 21f composes the other group and receives the identification and measurement information transmitted from the tire-based transmitting and receiving devices 10b and 10d on a per group basis. Further, the transmitting antennas 22a and 22b compose one group and perform the request transmitting processing on a per group basis and the transmitting antennas 22c and 22d compose the other group and perform the request transmitting processing on a per group basis.

Table 4 summarizes relationships between the above-described tire-based transmitting and receiving devices 10 (10a to 10d) and the vehicle body-based transmitting and receiving device 40. ○ represents that the transmission is possible and X represents that the transmission is impossible.

|  | Transmitting antenna 22a, 22b | Transmitting antenna 22c, 22d | Receiving antenna 21e | Receiving antenna 21f |
|---|---|---|---|---|
| Tire-based transmitting and receiving device 10a | ○ | X | ○ | X |
| Tire-based transmitting and receiving device 10b | ○ | X | X | ○ |
| Tire-based transmitting and receiving device 10c | X | ○ | ○ | X |
| Tire-based transmitting and receiving device 10d | X | ○ | X | ○ |

As described above, in the embodiment, each tire-based transmitting and receiving device 10 can receive the transmission request from any one group of the transmitting antennas 22, out of plural groups thereof, and the identification and measurement information transmitted from each tire-based transmitting and receiving device 10 can be received by any one group of the receiving antennas 21, out of plural groups thereof. Each tire-based transmitting and receiving device 10 has a different combination of the groups of the transmitting and receiving antennas 21 and 22, in which the transmitting antennas 22 transmit the transmission requests receivable by each tire-based transmitting and receiving device 10 and each tire-based transmitting and receiving device 10 transmits the identification information and the measurement information receivable by the receiving antennas 21.

Fifth Embodiment

The tire pressure monitoring system according to a fifth embodiment is different from that of the second embodiment in the configuration of the transmitting antenna and the receiving antenna of the vehicle body-based transmitting and receiving device. The tire pressure monitoring system according to the fifth embodiment will be described below. However, the description of the identical configuration to the second embodiment will be omitted.

Figure 6:
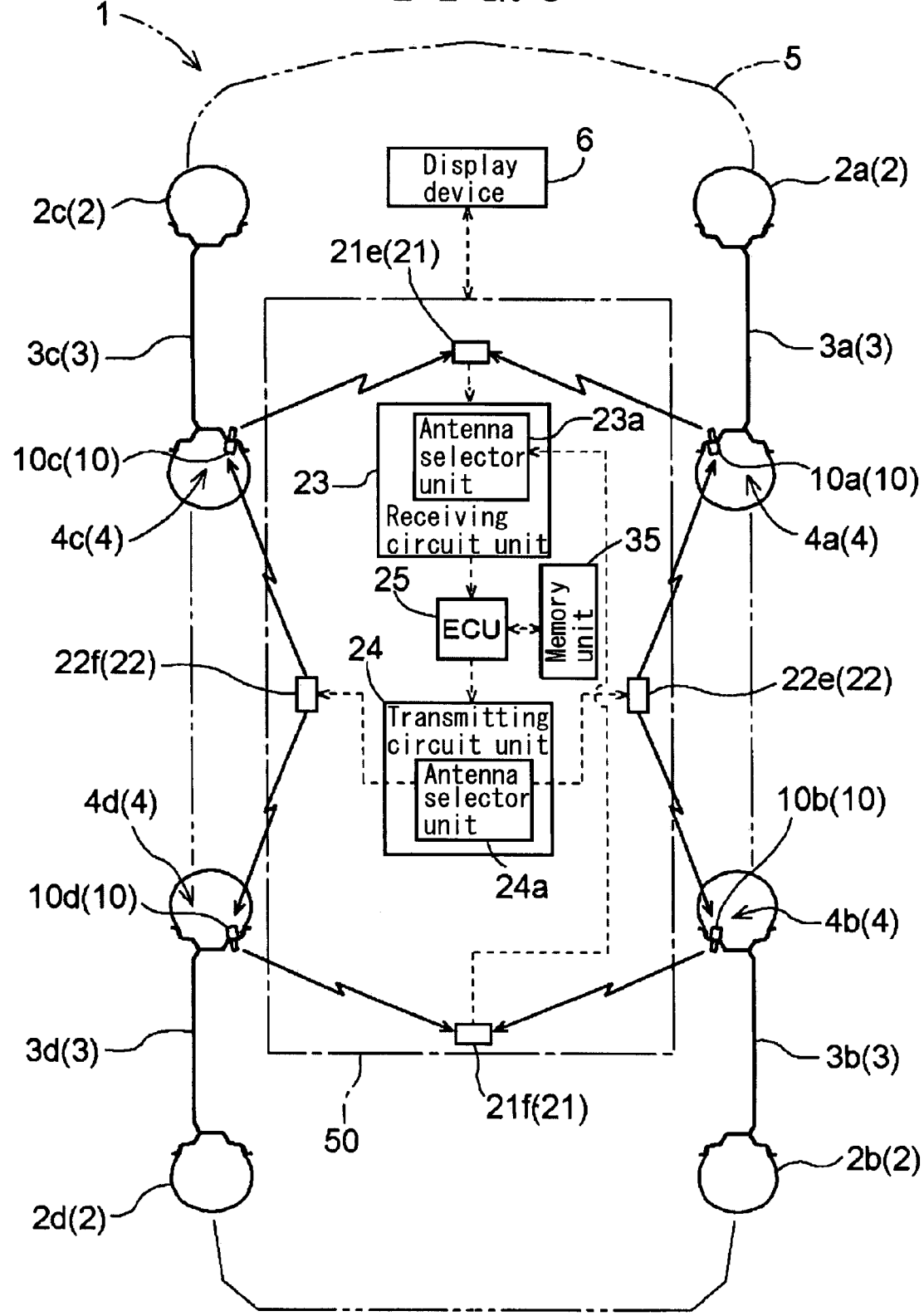
FIG. 6 is a functional block diagram of a tire pressure monitoring system according to a fifth embodiment.

FIG. 6 is a functional block diagram of the tire pressure monitoring system according to the fifth embodiment. In the vehicle body-based transmitting and receiving device 50 according to the embodiment, the transmitting antennas 22a and 22b and the distributor 26 of the vehicle body-based transmitting and receiving device 20 described in the second embodiment are replaced with the transmitting antenna 22e of this embodiment. Similarly, the transmitting antennas 22c and 22d and the distributor 27 of the vehicle body-based transmitting and receiving device 20 are replaced with the transmitting antenna 22f of this embodiment. Moreover, the receiving antennas 21a and 21c and the synthesizer 28 of the vehicle body-based transmitting and receiving device 20, which described in the second embodiment referring FIG. 3, are replaced with the receiving antenna 21e of this embodiment. Similarly, the receiving antennas 21b and 21d and the synthesizer 29 of the vehicle body-based transmitting and receiving device 20 are replaced with the receiving antenna 21f of this embodiment. The number of the transmitting and receiving antennas that the vehicle body-based transmitting and receiving device 50 has can be reduced by configuring the system as described above and the equipment cost can be reduced.

Six Embodiment

A tire pressure monitoring system of a sixth embodiment is a modification of the tire pressure monitoring system described in the fourth embodiment with reference to FIG. 5. The positioning of the four transmitting antennas included in the vehicle body-based transmitting and receiving device is modified. The tire pressure monitoring system of the sixth embodiment will be described below. However, the identical configurations to the fourth embodiment will be omitted.

Figure 7:
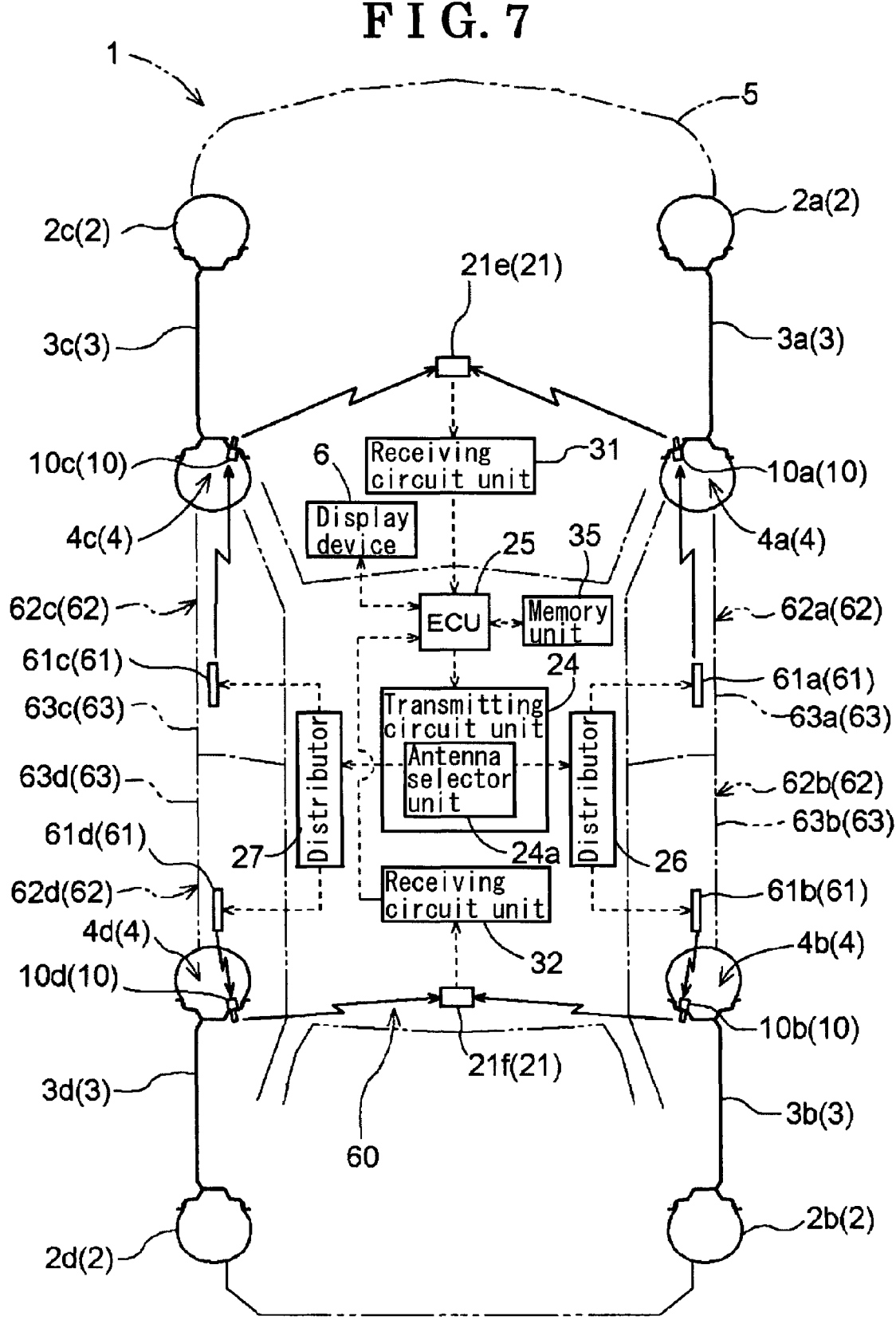
FIG. 7 is a functional block diagram of a tire pressure monitoring according to a sixth embodiment.
Figure 8:
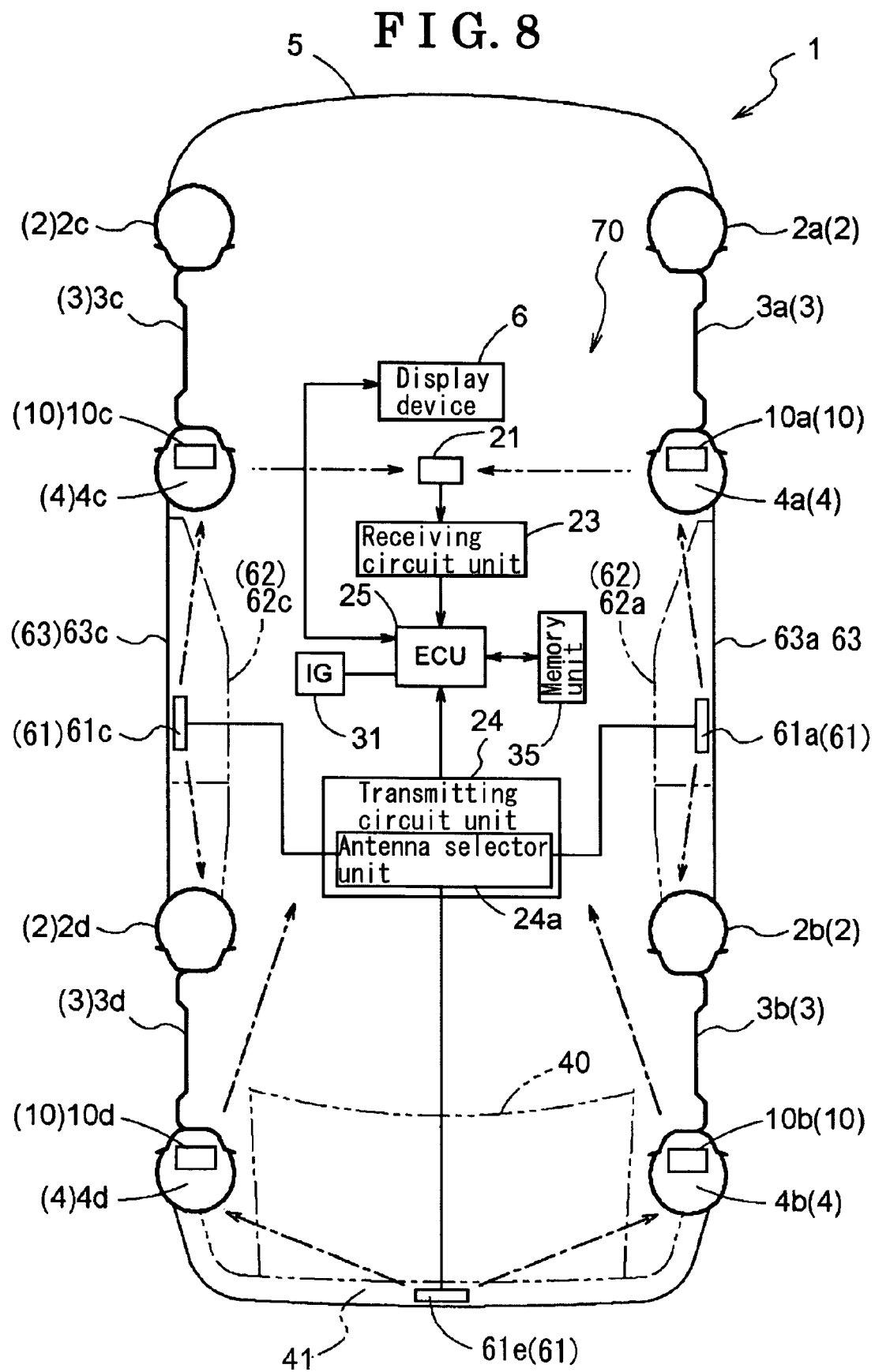
FIG. 8 is a functional block diagram of a tire information monitoring system (tire pressure monitoring system) according to another embodiment.

FIG. 7 is a functional block diagram of the tire pressure monitoring system according to the sixth embodiment. As illustrated in FIG. 7, the vehicle body-based transmitting and receiving device 60 has four transmitting antennas 61 (61a to 61d). FIG. 8 is a view describing an installation position of a transmitting antenna 61a included in the vehicle body-based transmitting and receiving device 60 illustrated in FIG. 7. Specifically, the four antennas 61 (61a to 61d) are provided at an outer side relative to metal plates 63 (63a to 63d). The metal plates 63 (63a to 63d) are the most outer metal plates structuring the side doors 62. Out of the four transmitting antennas 61 (61a to 61d), only the installation position of the transmitting antenna 61a, which is provided at the front of the right wheel side, is shown in FIG. 8. The installation forms of the other transmitting antennas 61b, 61c, and 61d are identical to that of the transmitting antenna 61a. Thus, the illustration and the description will be omitted. As illustrated in FIG. 8, from among the transmitting antennas 61 (61a to 61d) each serving as a vehicle body transmitting means included in the vehicle body-based transmitting and receiving device 60 illustrated in FIG. 7, a group of the transmitting antenna 61a provided at the front of the right wheel of the vehicle 1 is disposed in a right lateral side of a metal plate 63a, which is the most outer metal plate structuring a right side door 62a of the vehicle 1. Specifically, the transmitting antenna 61a is provided at inside of a door handle 64. The door handle 64 is provided at a surface of the metal plate 63a of the right side door 62a. Namely, the metal plate 63a structuring the side door 62a functions as a masking shield for the radio wave and thus the radio wave transmitted from the transmitting antenna 61a is not transmitted to the left side of the right side door 62a. Consequently, it is possible to ensure that the vehicle body-based transmitting and receiving device 60 can transmit the transmission request only to the desired tire-based transmitting and receiving devices 10 (the tire-based transmitting and receiving device 10a in this case).

The configurations of the transmitting antennas 61b, 61c and 61d are identical to that of the transmitting antenna 61a, and thus the illustrations of the transmitting antennas 61b, 61b and 61d are omitted. The transmitting antenna 61b is provided at the rear of the right wheel side of the vehicle 1 and disposed at an inside of a door handle which is located at a right lateral side of the most outer metal plate 63b structuring the right side door 62b of the vehicle 1. The transmitting antenna 61c is provided at the front of the left wheel side of the vehicle 1 and disposed at an inside of a door handle which is located at a left lateral side of the most outer side metal plate 63c structuring the left side door 62c of the vehicle 1. The transmitting antenna 61d is provided at the rear of the left wheel side of the vehicle 1 and disposed at an inside of a door handle which is located at a left lateral side of the most outer metal plate 63d structuring the left side door 62d of the vehicle 1. In this way, one group composed by the transmitting antennas 61a and 61b each serving as the vehicle body-based transmitting means is respectively disposed at the right sides of the most outer metal plates 63a and 63b. The metal plates 63a and 63b structure the right side doors 62a and 62b of the vehicle 1 respectively. Similarly, the other group composed by the transmitting antennas 61c and 61d each serving as the vehicle body-based transmitting means is respectively disposed at the left sides of the most outer metal plates 63c and 63d. The metal plates 63c and 63d structure the left side doors 62c and 62d of the vehicle 1 respectively. As described above, it is possible to ensure that the vehicle body-based transmitting and receiving device 60 can transmit the transmission request only to the desired tire-based transmitting and receiving devices 10.

Further, in this embodiment, the locking and unlocking system is built in the vehicle 1 and the system locks and unlocks the side doors 62 (62a to 62d) by using a wireless type key. In order to use locking and unlocking system, the occupant of the vehicle 1 has a wireless portable unit serving as an electric key for proving that the person is the occupant. When the occupant operates the operation switch 66 mounted in the door handle 64, the side doors 62 are unlocked. When the occupant gets out of inside of the vehicle 1 and operates the operation key, the side doors 62 are locked. Alternatively, the system may be configured so that a capacitance contact type detecting sensor is provided at the door handle 64, and the side doors 62 are unlocked when the occupant having the portable unit comes in contact with the contact type detecting sensor. Specifically, the unique identification signal is stored in the potable unit and the portable unit wirelessly transmits its identification signal to a unit located in the vehicle 1 in response to the receipt of a transmission request for identification signal in this system. Then, the unit located in the vehicle 1 conducts authentication of the identification signal of the portable unit based on the identification information transmitted from the portable unit. If the identification signal is valid, the unit located in the vehicle unlocks the door subject to the aforementioned artificial operation. In addition, the side doors 62 can be unlocked and locked by inserting the key into a key cylinder 65 provided at the side door handle 64. Also, there are the side doors 62 at which the key cylinder 65 is not provided.

As described above, a vehicle body-based transmitting means (transmitting antenna and the likes), a vehicle body receiving means, and a control circuit unit, such as an ECU are provided at the vehicle 1 for the unlocking and locking system. The vehicle body-based transmitting means is used for transmitting the transmission request for an identification signal to the portable unit. The vehicle body receiving means is used for receiving the identification signal from the portable unit, and the control circuit unit performs the processing for the signal transmitted between the vehicle body-based transmitting means and the vehicle body-based receiving means. The aforementioned tire pressure monitoring system is required to inform the occupant about the pressure of the tire interior spaces (4a to 4d) and the unlocking and locking system is required in parking the vehicle 1. Further, the both systems require the vehicle body-based transmitting means (transmitting antenna and the likes), the vehicle body-based receiving means (receiving antenna and the likes) and the ECU. Hence, in this embodiment, the vehicle body-based transmitting means, the vehicle-based receiving means, and the vehicle body-based controlling means included in the vehicle body-based transmitting and receiving device 60 are also used as the vehicle body-based transmitting means, the vehicle body-based receiving means and the control circuit unit, which perform signal processing for signals transmitted between the vehicle body-based transmitting means and the vehicle body-based receiving means, included in the unlocking and locking system respectively. Therefore, the system configuration of the existing unlocking and locking of the vehicle 1 can be also used as the system configuration of the tire pressure monitoring system. Thus, it is possible to reduce the equipment cost.

Other Embodiment

<1>

In the above-described embodiments, the sensor 17 is a pneumatic pressure sensor and measures the air pressure of the tire interior spaces 4. However, a temperature sensor, a voltage sensor may be additionally provided. In this case, the control circuit unit 12 of the tire-based transmitting and receiving devices 10 (10a to 10d) may amend the air pressure measured by the pneumatic pressure sensor based on the measurement of the temperature sensor. In such case, the control circuit unit 12 of the tire-based transmitting and receiving device 10 stores the air pressure, which is amended based on the measurement of the temperature sensor, in the memory unit 11. The voltage sensor measures the voltage value of the internal electrical power source (not shown) of the tire-based transmitting and receiving device 10 (10a to 10d) and the value of the air pressure and the value of the voltage are transmitted from the tire-based transmitting and receiving device 10 to the vehicle body-based transmitting and receiving device as the measurement information with the air pressure to display the information on the display device 6.

<2>

In the above-described embodiment, the vehicle body-based transmitting and receiving device has two or four vehicle body-based transmitting means and two or four vehicle body-based receiving means. However, the numbers of the vehicle body-based transmitting means and the vehicle body receiving means may be appropriately modified. For example, the configuration may be modified so that the vehicle body-based transmitting and receiving means has three vehicle body-based transmitting means and one vehicle body-based receiving means. Furthermore, the four wheel vehicle is used as example in the above-mentioned embodiment, the number of the wheels (the number of the tire-based transmitting and receiving device) may be set to any numbers. For example, the tire pressure monitoring system may be provided at a six-wheel vehicle or the likes.

Figure 9:
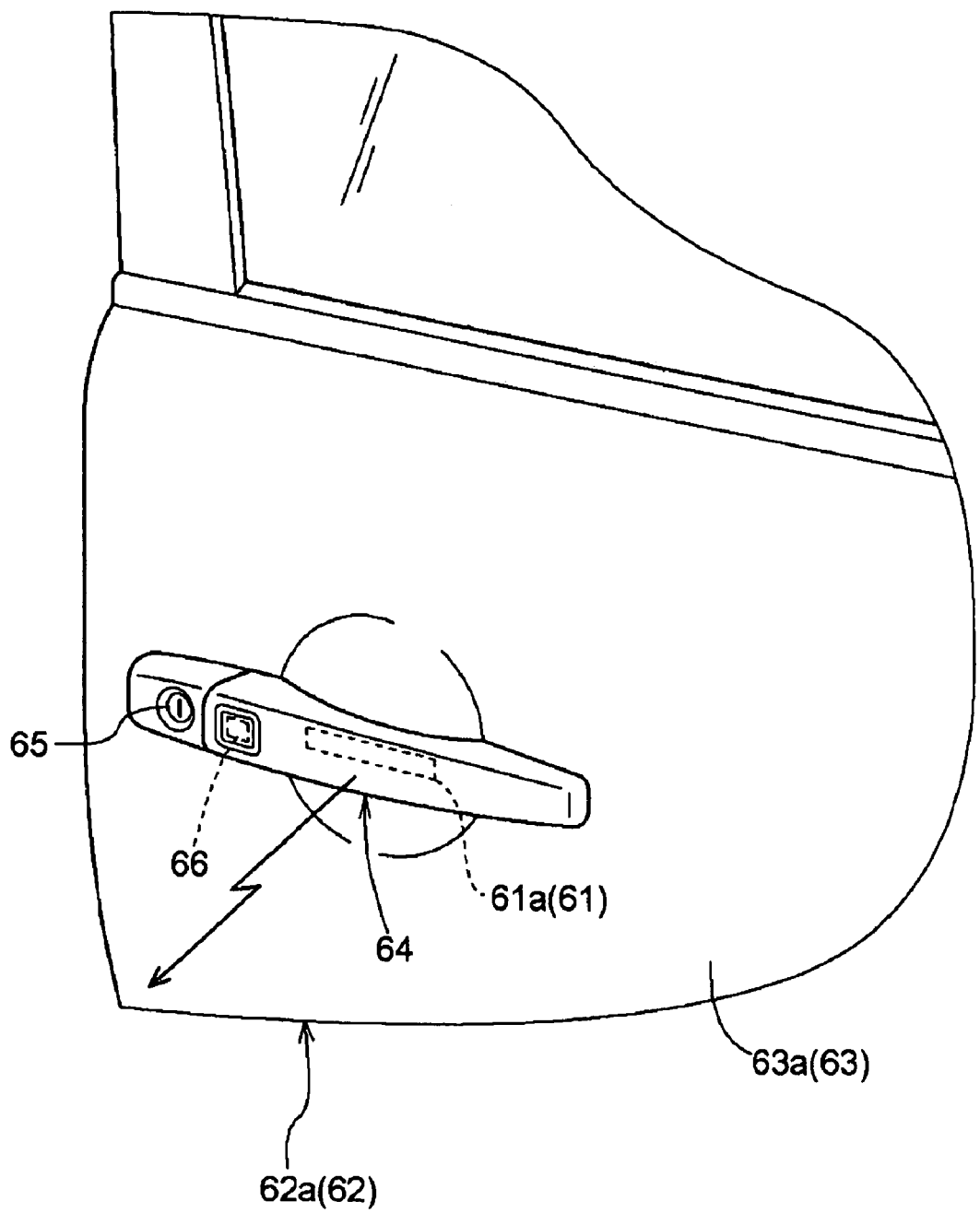
FIG. 9 is a view illustrating an installation position of a transmitting antenna of the vehicle transmitting and receiving device.

A tire information monitoring system (a tire pressure monitoring system) according to another embodiment will be described below. FIG. 8 is a functional block diagram of the tire information monitoring system and FIG. 9 is a view illustrating an installation position of the transmitting antenna included in the vehicle body-based transmitting and receiving device 70 shown in FIG. 8. As illustrated in FIG. 8, the tire information monitoring system (tire pressure monitoring system) is provided with a plurality of the tire-based transmitting and receiving devices 10 and the vehicle body-based transmitting and receiving device 70 installed at the side of the vehicle body 5 of the vehicle 1. A plurality of the tires 2 (2a to 2d) and a plurality of wheels 3 (3a to 3d) are provided at the vehicle 1 and a plurality of tire interior spaces are defined by the respective tires 2 and wheels 3 and each tire-based transmitting and receiving device is installed on each tire interior space. In the embodiment, the case in which the tire information monitoring system is applied to a four-wheel vehicle is described. However, the tire information monitoring system may be applied to the vehicle having three or more wheels.

As illustrated in FIG. 8, the vehicle body-based transmitting and receiving device 70 is provided with a receiving antenna 21 and transmitting antennas 61. The receiving antenna 21 receives the identification and measurement information transmitted from the tire-based transmitting and receiving devices 10 (10a to 10d) and the transmitting antennas 22 transmit transmission requests to the tire-based transmitting and receiving devices 10 (10a to 10d). Further, the vehicle body-based transmitting and receiving device 70 is provided with a memory unit 35, an ECU (electrical control unit) 25. The memory unit 35 stores information handled in the vehicle body-based transmitting and receiving device 70 (identification and measurement information received from the tire-based transmitting and receiving devices 10 (10a~10d) and the likes). The ECU 25 performs information receiving processing of the identification and measurement information with the receiving antenna 21 and the receiving circuit unit 23. The ECU 25 also performs request transmitting processing with the transmitting antennas 61 and the transmitting circuit unit 24. However, the system is configured so that the transmission request signals are transmitted from the transmitting circuit unit 24 to each transmitting antenna 61 via an antenna selector 24a included in the transmitting circuit unit 24. Thus, the transmission requests can not be simultaneously transmitted from each transmitting antenna and the transmission request can be transmitted only from the antenna which is selected by the antenna selector unit 24a. Further, an ignition key (IG) 31, which the occupant of the vehicle 1 operates, is provided being connected to the ECU 25. In the embodiment of the present invention, the vehicle body-based transmitting and receiving device 70 is provided with three transmitting antennas 61 (61a, 61c and 61d) for transmitting the transmission requests for the identification and measurement information to the tire-based transmitting and receiving devices 10 (10a to 10d). As described above, the receiving antenna 21 corresponds to the vehicle body receiving means of the present invention, the transmitting antennas 22 correspond to the vehicle body-based transmitting means of the present invention, and the memory unit 35 corresponds to a vehicle body-based memory means, and the ECU 25 corresponds to a vehicle body-based control means.

The specific configurations of the vehicle body-based transmitting and receiving device 70 and the tire-based transmitting and receiving devices 10 (10a to 10d) will be described below. In the tire information monitoring system according to the embodiment, when the vehicle body-based transmitting and receiving device 70 receives the identification and measurement information, the vehicle body-based transmitting and receiving device 70 determines which position the tire-based transmitting and receiving device 10 transmitting the identification information is positioned in the vehicle 1 based on the identification information by the tire-based transmitting and receiving device 10 by performing first and second information processing for wirelessly transmitting the identification and measurement information regarding the tire pressure of the tire interior space to the outside. Therefore, four identification information and the information regarding installation positions of the tire-based transmitting and receiving devices 10, which corresponds to the four identification and measurement information, are stored in the memory unit 35 of the vehicle body-based transmitting and receiving device 70. However, the tires 2 and the wheels 3 (i.e. the tire-based transmitting and receiving devices) may be replaced when the ignition key 31 of the vehicle 1 is turned off. In that case, the relationships between the identification information and the installation positions of the corresponding tire-based transmitting and receiving devices 70, which corresponds to the four identification and measurement information, becomes invalid. For the reason, every time the ignition key 31 is turned on, the vehicle body-based transmitting and receiving device 70 performs the transmission request for the identification and measurement information, which will be described later, to update the relationship between the corresponding identification information and the installation positions of the tire-based transmitting and receiving devices 10, which are stored in the memory unit 35.

The pressure of each interior space 4 (4a to 4d) is measured by the sensor 17 at the predetermined timing and the control circuit unit 12 of each tire-based transmitting and receiving device 10 (10a to 10d) accumulates the measurement information in the memory unit 11. When the control circuit unit 12 of each tire-based transmitting and receiving device 10 (10a to 10d) receives the transmission request for the identification and measurement information from the vehicle body-based transmitting and receiving device 70, the control circuit unit 12 performs the first information processing to wirelessly transmit the identification and measurement information to the outside. The circuit unit 12 performs the second information transmitting processing to automatically transmit the identification and measurement information to the outside after the ignition key 31 is turned on to start the vehicle 1. Further, the receiving circuit unit 15 and the transmitting circuit unit 13 of each tire-based transmitting and receiving devices 10 perform modulation processing of the received signal and demodulation processing of the signal to be transmitted. However, the system may be configured so that only the identification information is transmitted from the tire-based transmitting and receiving devices 10 to the outside in the first information transmitting processing. Alternatively, the system may be configured so that the vehicle body-based transmitting and receiving device 70 transmits the transmission request only for the identification information.

The vehicle body-based transmitting and receiving device 70 transmits the transmission requests for the identification and measurement information to each tire-based transmitting and receiving device 10 (10a to 10d) and then the tire-based transmitting and receiving unit 10 (10a to 10b) performs the first information transmitting processing. When the first information processing is performed, the vehicle body-based transmitting and receiving device 70 receives the identification and measurement information, which are sent back from each tire-based transmitting and receiving device 10 (10a to 10d). Additionally, the vehicle body-based transmitting and receiving device 70 receives the identification and measurement information transmitted from each tire-based transmitting and receiving device 10 (10a to 10d) when the tire-based transmitting and receiving device performs the second information transmitting processing. Then, the measurement information which the vehicle body-based transmitting and receiving device 70 obtains is displayed on the display device 6 provided at the vehicle 1 so that the occupant is able to recognize the information. In addition to the measurement information, the identification information may be displayed on the display device 6. Further, the transmitting circuit unit 24 performs the modulation processing of the transmission request and the receiving circuit unit 23 performs the demodulation processing of the signals received by each receiving antenna 21.

In the embodiment illustrated in FIG. 8, the tire-based transmitting and receiving devices 10 (10a to 10d) are installed on four positions, the right front portion, the right rear portion, the left front portion and the left rear portion of the vehicle 1. Further, the transmitting antennas 61a, 61e, 61c of the vehicle body-based transmitting and receiving device 70 are respectively installed on the right, rear, and left portions of the vehicle 1. As a result, the transmission request transmitted from the transmitting antenna 61a of the vehicle body-based transmitting and receiving device 70 is received by the tire-based transmitting and receiving devices 10a and 10c. The tire-based transmitting and receiving devices 10a and 10b are located at the right front and the right rear portions respectively. Further, the transmission request transmitted from the transmitting antenna 61e of the vehicle body-based transmitting and receiving device 70 is received by the tire-based transmitting and receiving devices 10b and 10d. The tire-based transmitting and receiving devices 10b and 10d are located at the right rear and the left rear portions respectively. The transmission request from the transmitting antenna 61c of the vehicle body-based transmitting and receiving device 70 is received by the tire-based transmitting and receiving devices 10c and 10d. The tire-based transmitting and receiving devices 10c and 10d are located at the left front and the left rear portions respectively. In other words, the right front tire-based transmitting and receiving device 10a and the right rear tire-based transmitting and receiving device 10b receive the transmission request from the antenna 61a of the vehicle body-based transmitting an receiving device 70 and the right rear tire-based transmitting and receiving devices 10b and the left rear tire-based transmitting and receiving device 10d receive the transmission request from the antenna 61e of the vehicle body-based transmitting an receiving device 70. In addition, the left front tire-based transmitting and receiving device 10c and the left rear tire-based transmitting and receiving device 10d receive the transmission request from the antenna 61c of the vehicle body-based transmitting an receiving device 70. As described above, the transmitting antennas 61 are configured so that the number of the transmitting antennas 61 is less than the number of the tire-based transmitting and receiving devices 10 and the respective tire-based transmitting and receiving devices 10 has a different combination of the transmitting antennas 61 which transmit the transmission request receivable by the tire-based transmitting and receiving device 10 from among the plural tire-based transmitting and receiving devices 10.

As described in FIG. 9, the transmitting antennas 61a and 61c are provided at the outer side relative to the most outer metal plates 63 (63a, 63c) configuring the side doors 62a and 62c. Only the installation position of the right front transmitting antenna 61a of the two transmitting antennas 61a and 61c is shown in FIG. 9. However, the installation form of the transmitting antenna 61c is identical to that of the transmitting antenna 61a. Thus, the illustration and description will be omitted.

As described in FIG. 9, the transmitting antenna 61a is provided at the right portion of the vehicle 1 and located at the right lateral side of the metal plate 63a. The metal plate 63a is the most outer plate structuring the side door 62a. Specifically, the transmitting antenna 61a is provided at inside of the door handle 64 and which is provided on the surface of the metal plate 63a of the right side door 62a. Namely, the metal plate 63a structuring the right side door 62a functions as a masking shield for the radio wave and thus the radio wave transmitted from the transmitting antenna 61a is not transmitted to the left side of the right side door 62a. Consequently, it is possible to ensure that the vehicle body-based transmitting and receiving device 70 can transmit the transmission request only to the desired tire-based transmitting and receiving devices 10. (the tire-based transmitting and receiving devices 10a and 10b in this case).

The configuration of the transmitting antenna 61c, which is provided at the left side of the vehicle 1, is identical to that of the transmitting antenna 61a, and thus the illustrations of the transmitting antenna 61c is omitted. The transmitting antenna 61b is disposed at inside of the door handle which is located at the left lateral side of the most outer metal plate 63c structuring the left side door 62c of the vehicle 1. As described above, it is possible to ensure that the vehicle body-based transmitting and receiving devices 70 transmit the transmission request only to the desired tire-based transmitting and receiving devices 10 (the tire-based transmitting and receiving devices 10c and 10d in this case).

In the embodiment shown in FIG. 8, the transmitting antenna 61e is provided at the rear portion of the vehicle 1 and is disposed in inside of the rear bumper 41 of the vehicle 1. More specifically, the transmitting antenna 61e is provided in the inside of the bumper 41 and the bumper 41 is formed by resin or the likes which easily transmits the radio wave. As a result, the transmission request transmitted from the transmitting antenna 61e is received by the tire-based transmitting and receiving devices 10b and 10d, which are located at the rear portion of the vehicle 1.

Further, in this embodiment, the locking and unlocking system is built in the vehicle 1 and the system locks and unlocks the side doors 62 (62a, 62b) and a car trunk 40 by using a wireless type key. In order to use locking and unlocking system, the occupant of the vehicle 1 has a wireless portable unit (not shown) serving as an electric key for verifying that the person is the occupant of the vehicle. When the occupant operates the operation switch 66 mounted in the door handle 64, the side doors 62 are unlocked. When the occupant gets out of the inside of the vehicle 1 and operates the operation switch 66, the side doors 62 are locked. Alternatively, the system may be configured so that a capacitance contact type detecting sensor is provided at the door handle 64, and the side doors 62 are unlocked when the occupant having the portable unit comes in contact with the contact type detecting sensor. Additionally, the car trunk 40 is unlocked when the occupant having the portable unit approaches the car trunk 40.

Specifically, the unique identification signal is stored in the potable unit and the portable unit wirelessly transmits its identification signal to a unit located in the vehicle 1 in response to the receipt of a transmission request for identification signal. Then, the unit located in the vehicle 1 conducts authentication of the identification signal of the portable unit based on the identification information transmitted from the portable unit. If the identification signal is valid, the unit located in the vehicle unlocks the door subject to the aforementioned artificial operation. (operation of the operation switch 66, the contact to the door handle 64 and the likes) Alternatively, if the identification signal is valid, the unit located in the vehicle unlocks the car trunk 40. Meanwhile, the side doors 62 can be unlocked and locked by inserting the key into a key cylinder 65 provided at the side door handle 64.

As described above, a vehicle body-based transmitting means (transmitting antennas 61), a vehicle body receiving means (receiving antennas 21), and a control circuit unit, such as an ECU are provided at the vehicle 1 in the aforementioned unlocking and locking system. The vehicle body-based transmitting means is used for transmitting the transmission request for an identification signal to the portable unit. The vehicle body receiving means is used for receiving the identification signal from the portable unit, and the control circuit unit performs the processing for the signal transmitted between the vehicle body-based transmitting means and the vehicle body-based receiving means. The aforementioned tire pressure monitoring system is required to inform the occupant about the pressure of the tire interior spaces and the unlocking and locking system is required in parking the vehicle 1. Further, the both systems require the vehicle body-based transmitting means (transmitting antennas 61), the vehicle body-based receiving means (receiving antenna 21) and the ECU 25. Hence, the vehicle body-based transmitting means, the vehicle body-based receiving means, and the vehicle body-based controlling means included in the vehicle body-based transmitting and receiving device 60 are also used as the vehicle body-based transmitting means, the vehicle body-based receiving means and the control circuit unit, which performs signal processing for signals transmitted between the vehicle body-based transmitting means and the vehicle body-based receiving means, included in the unlocking and locking system respectively in this embodiment. That is, the system is configured that transmission of the radio wave used when the transmitting antennas 61 transmit the transmission requests may be switched to transmission of the radio wave used when the vehicle body-based transmitting means is used in the unlocking and locking. Therefore, the system configuration of the existing unlocking and locking of the vehicle 1 can be also used as the system configuration of the tire pressure monitoring system. Thus, it is possible to reduce the equipment cost.

When the vehicle body-based transmitting means (transmitting antennas 61), the vehicle body-based receiving means (receiving antennas 21), and the ECU 25 function as the tire information monitoring system, a transmission output of the radio wave used for transmitting the transmission request is set so as to be larger than that of the radio wave used for the unlocking and locking system. As described above, the transmission output of the radio wave used for transmitting the transmission request is set so as to be larger than that of the radio wave used for the unlocking and locking system so that the radio wave transmitted from the transmitting antennas 61 for the unlocking and locking system does not reach very far. Consequently, it is possible to determine the positions of the tires without fail while maintaining the security. On the other hand, unlike this embodiment, if the transmission output of the radio wave used for the unlocking and locking system is set so as to be larger than that of the radio wave for transmitting the transmission request, the door is unlocked even before the user having the key comes enough close to the vehicle, a third party may break into the vehicle before the user approaches at the vehicle.

According to the configuration described above, each tire-based transmitting and receiving device of each tire interior space is able to receive the transmission request from at least one group of the vehicle body-based transmitting means and the identification and measurement information transmitted from the tire-based transmitting and receiving devices are receivable by the vehicle body-based transmitting means of any one of the transmitting groups. Thus, all of the tire-based transmitting and receiving devices receive the transmission requests from any one of the transmitting groups and the identification and measurement information transmitted by all of the tire-based transmitting and receiving devices is receivable by any one of the receiving groups. Namely, bidirectional communication is established. The relational expression $(2^m-1)\times(2^n-1)\geqq t$ is satisfied with the variable t representing the number of the tire-based transmitting and receiving devices, the variable m representing the number of the vehicle body-based transmitting means and the variable n representing the number of the vehicle based receiving means. Each tire-based transmitting and receiving device is configured to receive the transmission request from the vehicle body-based transmitting means of any one of the transmitting groups, and the identification information and the measurement information transmitted from the tire-based transmitting and receiving device is received by the vehicle body-based receiving means of any one of the receiving groups. Each tire-based transmitting and receiving device has a different combination of the transmitting group of the vehicle body-based transmitting means that transmits the transmission request receivable by the tire-based transmitting and receiving device and the receiving group of the vehicle body-based receiving means which receives the identification information and the measurement information transmitted from the tire-based transmitting and receiving device. Therefore, it is possible to determine the position of the tire-based transmitting and receiving device, i.e. the position of the tire at which the tire-based transmitting and receiving device is provided in the vehicle, based on the combination of the group of the vehicle body-based transmitting means which transmits the transmission request and the group of the vehicle body-based receiving means which receives the identification and measurement information. Further, as stated in the relational expression, $(2^m-1)\times(2^n-1)$ ways combinations, which enable bidirectional communication, is possible by the number of the group of the vehicle body-based transmitting means m and the number of the group of the vehicle body-based receiving means n. The relational expressions m<t and n<t are satisfied and it is possible to reduce the group number of the vehicle body-based transmitting means m and the vehicle body-based receiving means n. Thus, according to the embodiments of the invention, it is possible to provide the tire pressure monitoring system which is able to determine the positions of the tire-based transmitting and receiving devices while performing the request transmitting processing of the transmission request and the information receiving processing of the identification and measurement information with a small load and a short time in the vehicle body-based transmitting and receiving means.

According to the configuration described above, the number of the group of the vehicle body-based transmitting means is 2 and the number of the group of the vehicle body-based receiving means is 2. Thus, it is possible to determine the positions of 9 or less than 9 tires based transmitting and receiving devices. Therefore, the vehicle body-based transmitting and receiving device receives the identification and measurement information determining the position of each tire in the four wheel vehicle at which the tire-based transmitting and receiving devices are provided.

According to the configuration described above, when the transmission requests are received by the two tire-based transmitting and receiving devices which are provided at the right wheel side, the identification and measurement information transmitted from the two tire-based transmitting and receiving devices are received by the group of the vehicle body-based receiving means provided at the front wheel side and the other group of the vehicle body-based receiving means provided at the rear wheel side respectively. Similarly, the transmission requests are received by the two tire-based transmitting and receiving devices which are provided at the left wheel side, the identification and measurement information transmitted from the two tire-based transmitting and receiving devices are received by the group of the vehicle body-based receiving means provided at the front wheel side and the other group of the vehicle body-based receiving means provided at the rear wheel side respectively. Thus, the vehicle body transmitting and receiving device is able to determine if the tire-based transmitting and receiving device having the received identification information is provided at the right wheel side or the left wheel side and determines if the tire-based transmitting and receiving device having the received identification information is provided at the front wheel side or the rear wheel side. When the timings of the transmission, which is performed after receiving the transmission requests, are different between the respective tire-based transmitting and receiving devices provided at the front wheel side and the rear wheel side and each group of the vehicle body-based transmitting and receiving device receives the transmission signals transmitted from both the tire-based transmitting and receiving devices, the position may be determined by the received signal strength. The stronger received signal strength is transmitted from the nearer position.

According to the configuration described above, the most outer metal plate structuring the right side door of the vehicle functions as a masking shield for the radio wave and thus the radio wave transmitted from the one group of the vehicle body-based transmitting means is not transmitted to the left side of the right side door. As a result, the radio wave transmitted from the one group of the vehicle is received by the two tire-based transmitting and receiving devices located at the right wheel side of the vehicle and is not received the two tire-based transmitting and receiving devices located at the left wheel side of the vehicle. Similarly, the most outer metal plate structuring the left side door of the vehicle functions as a masking shield for the radio wave and thus the radio wave transmitted from the other group of the vehicle body-based transmitting means is not transmitted to the right side of the left side door. As a result, the radio wave transmitted from the other group of the vehicle is received by the two tire-based transmitting and receiving devices located at the left wheel side of the vehicle and is not received the two tire-based transmitting and receiving devices located at the right wheel side of the vehicle. Therefore, each tire-based transmitting and receiving devices selectively receives the transmission request from the specific group from among the vehicle body-based transmitting means.

According to the above-described configuration, the existing system configuration of the unlocking and locking system can be also used as the system configuration of the tire pressure monitoring system in the vehicle. Thus, it is possible to reduce the equipment cost for the tire pressure monitoring system.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A tire pressure monitoring system comprising:
a plurality of tire-based transmitting and receiving devices respectively installed at tire interior spaces defined by a plurality of tires and a plurality of wheels provided at a vehicle, each tire-based transmitting and receiving device having:
an air pressure measuring means measuring pressure of the tire interior space;
a tire based transmitting means transmitting, to an exterior portion, unique identification information specified to the tire-based transmitting and receiving device and measurement information of the air pressure measuring means;
a tire based receiving means receiving a transmission request from the exterior portion for transmitting the identification information and the measurement information; and
a tire based controlling means performing information transmitting processing for the tire based transmitting means to transmit the identification information and the measurement information to the exterior portion when the tire based receiving means receives the transmission request,
a vehicle body-based transmitting and receiving device installed at a vehicle body having:
a plurality of vehicle body-based receiving means receiving the identification information and the measurement information transmitted from the tire-based transmitting and receiving devices;
a plurality of vehicle body-based transmitting means transmitting the transmission requests to the tire-based transmitting and receiving devices; and
a vehicle body-based controlling means performing information receiving processing for the vehicle body-based receiving means to receive the identification information and the measurement information and request transmitting processing for the vehicle body-based transmitting means to transmit the transmission requests,
wherein the vehicle body-based transmitting means are less in quantity than the tire-based transmitting and receiving devices and are divided into plural transmitting groups, each of which transmitting group has at least one of the vehicle body-based transmitting means, and the request transmitting processing is implemented on a per transmitting group basis,
wherein the vehicle body-based receiving means are less in quantity than the tire-based transmitting and receiving devices and are divided into plural receiving groups, each of which receiving group has at least one of the vehicle body-based receiving means, and the identification information and the measurement information, which are transmitted from the tire-based transmitting and receiving devices, are received on a per receiving group basis, wherein a relational expression $(2^m-1) \times (2^n-1) \geq t$ is satisfied with a variable t representing the number of the tire-based transmitting and receiving devices, a variable m representing the number of the transmitting groups and a variable n representing the number of the receiving groups,
each tire-based transmitting and receiving device is configured to receive the transmission request from the vehicle body-based transmitting means of any one of the transmitting groups, the identification information and the measurement information transmitted from the tire-based transmitting and receiving device is received by the vehicle body-based receiving means of any one of the receiving groups, and each tire-based transmitting and receiving device has a different combination of the transmitting group of the vehicle body-based transmitting means that transmits the transmission request receivable by the tire-based transmitting and receiving device and the receiving group of the vehicle body-based receiving means which receives the identification information and the measurement information transmitted from the tire-based transmitting and receiving device.

2. A tire pressure monitoring system according to claim 1, wherein the number of the transmitting groups is two, the number of the receiving groups is two and the number of the tire-based transmitting and receiving devices is four.

3. A tire pressure monitoring system according to claim 2, wherein the transmission requests transmitted from one group the transmitting groups is received by two tire-based transmitting and receiving devices provided at a right wheel side of the vehicle of the plural tire-based transmitting and receiving devices and the transmission requests transmitted from the other group of the transmitting groups is received by two tire-based transmitting and receiving devices provided at a left wheel side of the vehicle of the plural tire-based transmitting and receiving devices, the identification information and the measurement information received by one group of the vehicle body-based receiving means are transmitted from two tire-based transmitting and receiving devices provided at a front wheel side of the vehicle of the plural tire-based transmitting and receiving devices, and the identification information and the measurement information received by the other group of the vehicle body-based receiving means are transmitted from two tire-based transmitting and receiving devices provided at a rear wheel side of the plural tire-based transmitting and receiving devices.

4. A tire pressure monitoring system according to claim 3, wherein the one group of the transmitting groups is located at a right lateral side of a most outer metal plate structuring a right side door of the vehicle and the other group of the transmitting groups is located at a left lateral side of a most outer metal plate structuring a left side door of the vehicle.

5. A tire pressure monitoring system according to claim 3, wherein the vehicle body-based transmitting means, the vehicle body-based receiving means and the vehicle body-based controlling means included in the vehicle body-based transmitting and receiving device are configured so as to be also used as a transmitting antenna, a receiving antenna and a controlling circuit unit, which processes signals transmitted between the transmitting antenna and the receiving antenna, the transmitting antenna, the receiving antenna and the controlling circuit unit being included in an unlocking and locking system that unlocks and locks the side doors of the vehicle by using a wireless type key.

6. A tire pressure monitoring system according to claim 4, wherein the vehicle body-based transmitting means, the vehicle body-based receiving means and the vehicle body-based controlling means included in the vehicle body-based transmitting and receiving device are configured so as to be also used as a transmitting antenna, a receiving antenna and a controlling circuit unit, which processes signals transmitted between the transmitting antenna and the receiving antenna, included in an unlocking and locking system which unlocks and locks the side door of the vehicle by using a wireless type key.

7. A tire pressure monitoring system according to claim 1, wherein
the vehicle body-based receiving means includes:
one receiving antenna provided at a front side relative to a center of a wheelbase of the vehicle; and
the other receiving antenna provided at a rear side relative to the center of the wheelbase of the vehicle,
the vehicle body-based transmitting means includes:
one transmitting antenna provided at one side of the vehicle; and
the other transmitting antenna provided at the other side of the vehicle,
the transmission requests transmitted by the one transmitting antenna are received by the tire-based transmitting and receiving devices which are provided at the one side of the vehicle and the transmission requests transmitted from the other transmitting antenna are received by the tire-based transmitting and receiving devices which are provided at the other side of the vehicle, the identification information and the measurement information transmitted from the tire-based transmitting and receiving devices which are provided at the front side relative to the center of the wheelbase is received by the one receiving antenna, the identification information and the measurement information transmitted from the tire-based transmitting and receiving devices which are provided at the rear side relative to the center of the wheelbase is received by the other receiving antenna.

8. A tire pressure monitoring system according to claim 1, wherein
the vehicle body-based receiving means includes:
a first receiving antenna provided at a front side relative to a center of a wheelbase of the vehicle and located at one side of the vehicle;
a second receiving antenna provided at the front side relative to the center of the wheelbase of the vehicle and located at the other side of the vehicle;
a third receiving antenna provided at a rear side relative to the center of the wheelbase of the vehicle and located at the one side of the vehicle; and
a fourth receiving antenna provided at the rear side relative to the center of the wheelbase of the vehicle and located at the other side of the vehicle,
the vehicle body-based transmitting means includes:
a first transmitting antenna provided at the front side relative to the center of the wheelbase of the vehicle and located at the one side of the vehicle;
a second transmitting antenna provided at the front side relative to the center of the wheelbase of the vehicle and located at the other side of the vehicle;
a third transmitting antenna provided at the rear side relative to the center of the wheelbase of the vehicle and located at the one side of the vehicle; and
a fourth transmitting antenna provided at the rear side relative to the center of the wheelbase of the vehicle and located at the other side of the vehicle,
the tire-based transmitting and receiving devices include:
a first tire-based transmitting and receiving device provided at the front side relative to the center of the wheelbase of the vehicle and located at the one side of the vehicle;
a second tire-based transmitting and receiving device provided at the front side relative to the center of the wheelbase of the vehicle and located at the other side of the vehicle;
a third tire-based transmitting and receiving device provided at the rear side relative to the center of the wheelbase of the vehicle and located at the one side of the vehicle; and
a fourth tire-based transmitting and receiving device provided at the rear side relative to the center of the wheelbase of the vehicle and located at the other side of the vehicle,
the transmission requests transmitted from the first, second, third, fourth transmitting antennas are received by the first, second, third, and fourth tire-based transmitting and receiving devices respectively, the identification information and the measurement information transmitted from the first, second, third, and fourth tire-based transmitting and receiving devices are received by the first, second, third, fourth receiving antennas respectively.

9. A tire pressure monitoring system according to claim 1, wherein
the vehicle body-based receiving means includes:
one receiving antenna provided at a front side relative to a center of a wheelbase of the vehicle; and
the other antenna provided at a rear side relative to the center of the wheelbase of the vehicle,
the vehicle body-based transmitting means includes:
a first transmitting antenna provided at the front side relative to the center of the wheelbase of the vehicle and located at one side of the vehicle;
a second transmitting antenna provided at the front side relative to the center of the wheelbase of the vehicle and located at the other side of the vehicle;
a third transmitting antenna provided at the rear side relative to the center of the wheelbase of the vehicle and located at the one side of the vehicle; and
a fourth transmitting antenna provided at the rear side relative to the center of the wheelbase of the vehicle and located at the other side of the vehicle,
the tire-based transmitting and receiving devices include:
a first tire-based transmitting and receiving device provided at the front side relative to the center of the wheelbase of the vehicle and located at the one side of the vehicle;
a second tire-based transmitting and receiving device provided at the front side relative to the center of the wheelbase of the vehicle and located at the other side of the vehicle;
a third tire-based transmitting and receiving device provided at the rear side relative to the center of the wheelbase of the vehicle and located at the one side of the vehicle; and
a fourth tire-based transmitting and receiving device provided at the rear side relative to the center of the wheelbase of the vehicle and located at the other side of the vehicle,
the transmission requests transmitted by the first, second, third, fourth transmitting antennas are received by the first, second, third, and fourth tire-based transmitting and receiving devices respectively, the identification information and the measurement information transmitted from the first and second tire-based transmitting and receiving devices is received by the one antenna, and the identification information and the measurement information transmitted from the third and fourth tire-based transmitting and receiving devices are received by the other antenna.

10. A tire pressure monitoring system comprising:
a plurality of tire-based transmitting and receiving devices respectively installed at tire interior spaces defined by a plurality of tires and a plurality of wheels provided at a vehicle, each tire-based transmitting and receiving device including:
a tire information measuring means measuring at least pressure of the tire interior space;
a tire based transmitting means wirelessly transmitting, to an exterior portion, identification information uniquely specified to the tire-based transmitting and receiving device and measurement information of the tire information measuring means;
a tire based receiving means receiving a transmission request from the exterior portion for transmitting the identification information and the measurement information; and
a tire based controlling means performing information transmitting processing for the tire based transmitting means to transmit the identification information and the measurement information to the exterior portion when the tire based receiving means receives the transmission request,
a vehicle body-based transmitting and receiving device installed at a vehicle body having:
one or more vehicle body-based receiving means receiving the identification information and the measurement information transmitted from the tire-based transmitting and receiving devices;
two or more vehicle body-based transmitting means transmitting the transmission requests to the tire-based transmitting and receiving devices; and
a vehicle body-based controlling means performing information receiving processing for the vehicle body-based receiving means to receive the identification information and the measurement information and request transmitting processing for the vehicle body-based transmitting means to transmit the transmission requests,
wherein the two or more vehicle body-based transmitting means are less in quantity than the tire-based transmitting and receiving devices and are arranged so that each tire-based transmitting and receiving device has a different combination of the vehicle body-based transmitting means from among two or more vehicle body-based transmitting means which transmit the transmission requests received by the one tire-based transmitting and receiving device from among the tire-based transmitting and receiving devices, the vehicle based controlling means determines installation positions of the tire-based transmitting and receiving devices in the vehicle based on a combination of one and more identification information received by the one or more vehicle body-based receiving means when the transmission requests are respectively transmitted from the two or more vehicle body-based transmitting means.

11. A tire pressure monitoring system according to claim 10, wherein the tire-based transmitting and receiving devices are located at 4 positions, a right front portion, a right rear portion, a left front portion, and a left rear portion of the vehicle, the vehicle body-based transmitting and receiving device has three vehicle body-based transmitting means, the three vehicle body-based transmitting means are disposed in a way that the tire-based transmitting and receiving devices located at the right front portion and the right rear portion of the vehicle receive the transmission requests from an identical vehicle body-based transmitting means of the three or more vehicle body-based transmitting means, the tire-based transmitting and receiving devices located at the left front portion and the left rear portion of the vehicle receive the transmission requests from an identical vehicle body-based transmitting means of the three or more vehicle body-based transmitting means and the tire-based transmitting and receiving devices located at the right front portion and the left front portion of the vehicle receive the transmission requests from an identical vehicle body-based transmitting means of the three or more vehicle body-based transmitting means, or in another way that the tire-based transmitting and receiving devices located at the right front portion and the right rear portion of the vehicle receive the transmission requests from the identical vehicle body-based transmitting means of the three or more vehicle body-based transmitting means, the tire-based transmitting and receiving devices located at the left front portion and the left rear portion of the vehicle receive the transmission requests from the identical vehicle body-based transmitting means of the three or more vehicle body-based transmitting means and the tire-based transmitting and receiving devices located at the right rear portion and the left rear portion of the vehicle receive the transmission requests from the identical vehicle body-based transmitting means of the three or more vehicle body-based transmitting means,
or in another way that the tire-based transmitting and receiving devices located at the right front portion and the right rear portion of the vehicle receive the transmission requests from the identical vehicle body-based transmitting means of the three or more vehicle body-based transmitting means, the tire-based transmitting and receiving devices located at the right front portion and the left front portion of the vehicle receive the transmission requests from the identical vehicle body-based transmitting means of the three or more vehicle body-based transmitting means and the tire-based transmitting and receiving devices located at the right rear portion and the left rear portion of the vehicle receive the transmission requests from the identical vehicle body-based transmitting means of the three or more vehicle body-based transmitting means,
or in another way that that the tire-based transmitting and receiving devices located at the left front portion and the left rear portion of the vehicle receive the transmission requests from the identical vehicle body-based transmitting means of the three or more vehicle body-based transmitting means, the tire-based transmitting and receiving devices located at the right front portion and the left front portion of the vehicle receive the transmission requests from the identical vehicle body-based transmitting means of the three or more vehicle body-based transmitting means and the tire-based transmitting and receiving devices located at the right rear portion and the left rear portion of the vehicle receive the transmission requests from the identical vehicle body-based transmitting means of the three or more vehicle body-based transmitting means.

12. A tire pressure monitoring system according to claim 10, wherein the vehicle body-based transmitting means, the vehicle body-based receiving means and the vehicle body-based controlling means included in the vehicle body-based transmitting and receiving device are configured so as to be also used as a transmitting antenna, a receiving antenna and a controlling circuit unit, which processes signals transmitted between the transmitting antenna and the receiving antenna, the transmitting antenna, the receiving antenna and the controlling circuit unit being included in an unlocking and locking system which unlocks and locks side doors of the vehicle or a trunk of the vehicle by using a wireless type key.

13. A tire pressure monitoring system according to claim 11, wherein the vehicle body-based transmitting means, the vehicle body-based receiving means and the vehicle body-based controlling means included in the vehicle body-based transmitting and receiving device are configured so as to be also used as a transmitting antenna, a receiving antenna and a controlling circuit unit, which processes signals transmitted between the transmitting antenna and the receiving antenna, the transmitting antenna, the receiving antenna and the controlling circuit unit being included in an unlocking and locking system that unlocks and locks side doors of the vehicle or a trunk of the vehicle by using a wireless type key.

14. A tire pressure monitoring system according to claim 12, wherein transmission of a radio wave used when the vehicle body-based transmitting means transmit the transmission requests may be switched to transmission of a radio wave used when the vehicle body-based transmitting means is used for the unlocking and locking system, and a transmission output used for transmitting the transmission requests is set to larger than a transmission output of the radio wave used for the unlocking and locking system.

15. A tire pressure monitoring system according to claim 13, wherein transmission of a radio wave used when the vehicle body-based transmitting means transmit the transmission requests may be switched to transmission of a radio wave used when the vehicle body-based transmitting means is used for the unlocking and locking system, and a transmission output used for transmitting the transmission requests is set to larger than a transmission output of the radio wave used for the unlocking and locking system.

* * * * *